United States Patent [19]
Yamashita

[11] Patent Number: 5,989,743
[45] Date of Patent: Nov. 23, 1999

[54] NON-AQUEOUS BATTERY

[75] Inventor: Masaya Yamashita, Machida, Japan

[73] Assignee: Asahi Kasei Kogyo Kabushiki Kaisha, Osaka, Japan

[21] Appl. No.: 08/809,792

[22] PCT Filed: Sep. 27, 1995

[86] PCT No.: PCT/JP95/01962

§ 371 Date: May 22, 1997

§ 102(e) Date: May 22, 1997

[87] PCT Pub. No.: WO96/10273

PCT Pub. Date: Apr. 4, 1996

[30] Foreign Application Priority Data

Sep. 27, 1994 [JP] Japan .................................. 6-231400
Sep. 27, 1994 [JP] Japan .................................. 6-231401

[51] Int. Cl.[6] ........................ H01M 10/14; H01M 10/44
[52] U.S. Cl. ........................ 429/129; 429/94; 429/161; 429/170; 429/234; 429/238; 429/246
[58] Field of Search ........................ 429/94, 129, 170, 429/234, 246, 161, 238

[56] References Cited

U.S. PATENT DOCUMENTS

| | | | |
|---|---|---|---|
| 4,622,277 | 11/1986 | Bedder et al. .................. | 429/94 |
| 4,731,304 | 3/1988 | Lundquist et al. .................. | 429/62 |
| 4,879,190 | 11/1989 | Lundsgaard . | |
| 5,147,737 | 9/1992 | Post et al. .................. | 429/94 |
| 5,401,595 | 3/1995 | Kagawa et al. . | |
| 5,736,270 | 4/1998 | Suzuki et al. .................. | 429/94 |

FOREIGN PATENT DOCUMENTS 1-279578 11/1989 Japan .
5-74496 7/1994 Japan .
6-187959 7/1994 Japan .

*Primary Examiner*—Maria Nuzzolillo
*Assistant Examiner*—Mark Ruthkosky
*Attorney, Agent, or Firm*—Birch, Stewart, Kolasch & Birch, LLP

[57] ABSTRACT

Disclosed is a novel non-aqueous battery comprising a spirally wound electrode assembly comprising a cathode, an anode and a separator which are spirally wound so that the cathode and anode active material layers are arranged opposite to each other through the separator, wherein the battery has a cathode-equipotential metallic segment provided in association with the cathode, wherein the segment has on at least one side thereof a portion free of a cathode active material layer to provide a cathode-equipotential, exposed metallic portion ($\alpha$) longitudinally extending over a length of one wind or more of the spirally wound structure, the portion ($\alpha$) being positioned opposite to an anode-equipotential, exposed metallic portion ($\beta$) which is provided, in association with the anode, over a length of one wind or more of the spirally wound structure. Also disclosed is a non-aqueous battery comprising a stacked or zigzag-folded laminate electrode assembly accommodated in a casing, each having substantially the same structure as that of the spirally wound electrode assembly. By virtue of the unique construction, an accident in which the battery is crushed by an external pressure, overcharged by a malfunctioning of a charging circuit, pentrated with an iron nail etc., or heated by external high temperature heat source, a low resistance short-circuiting safely occurs between metallic segments without suffering a large temperature elevation.

20 Claims, 12 Drawing Sheets

NON-AQUEOUS BATTERY

BACKGROUND OF THE INVENTION

1. Field of the Invention

The present invention relates to a novel non-aqueous battery. More particularly, the present invention is concerned with a non-aqueous battery comprising (1) a casing, (2) a non-aqueous electrolyte contained in a space defined by an inner wall of the casing, and (3) a spirally wound electrode assembly accommodated in the above-mentioned space, operatively with the non-aqueous electrolyte, wherein the spirally wound electrode assembly comprises a cathode (comprising a cathode active material layer), an anode (comprising an anode active material layer) and a separator which are spirally wound together into a spirally wound structure so that the cathode active material layer and the anode active material layer are arranged opposite to each other through the separator, and wherein the battery has a cathode-equipotential metallic segment provided in association with the cathode, in which the cathode-equipotential metallic segment has on at least one side thereof a portion free of a cathode active material layer to provide a cathode-equipotential, exposed metallic portion ($\alpha$) longitudinally extending over a length of one wind or more of the spirally wound structure, wherein the cathode-equipotential, exposed metallic portion ($\alpha$) Is positioned opposite to an anode-equipotential, exposed metallic portion ($\beta$) which is provided, in association with the anode, over a length of one wind or more of the spirally wound structure. The present invention is also concerned with a non-aqueous battery having substantially the same construction as in the above-mentioned battery, except that, in place of the above-mentioned spirally wound electrode assembly, use is made of a stacked laminate electrode assembly or a zigzag-folded laminate electrode assembly, each having substantially the same cathode/separator/anode structure as that of the above-mentioned spirally wound electrode assembly. By virtue of the above-mentioned unique construction of the battery of the present invention, it has become possible to ensure the safety of the battery even when the battery suffers an accident. Specifically, even when the battery of the present invention suffers accidents, such as an accident In which the battery casing is crushed by an external pressure, an accident in which the battery is overcharged by a malfunctioning of a charging circuit or the like, an accident in which the battery is penetrated with a metallic nail or the like, and an accident in which the battery is exposed to heat from an external high-temperature heat source, the battery is adapted to be easily subject to short-circuiting between metallic segments having very low electric resistance, to thereby prevent the occurrence of a rapid temperature elevation in the battery, so that the safety of the battery can be ensured.

2. Prior Art

A conventional lithium ton secondary battery using a non-aqueous electrolytic liquid generally has a construction in which a spirally wound electrode assembly is used, wherein the electrode assembly comprises a cathode sheet (prepared by coating an aluminum foil with a lithium-containing composite metal oxide as a cathode active material), an anode sheet (prepared by coating a copper foil with a carbonaceous material as an anode active material) and a separator composed of a microporous polyethylene film or the like (which is disposed between the cathode sheet and the anode sheet) which are spirally wound together into a spirally wound structure, and in which the electrode assembly is accommodated In a can made of stainless steel, which functions as an outside electrode, such as an outside anode. With respect to the details of the above-mentioned lithium ion secondary battery using a non-aqueous electrolytic liquid, reference can be made, for example, to Unexamined Japanese Patent Application Laid-Open Specification No. 2-51875 and Unexamined Japanese Patent Application Laid-Open Specification No. 5-234620.

The above-mentioned lithium ion secondary battery has various advantageous characteristics, such as high capacity, high voltage and high output. However, due to the above-mentioned characteristics of the lithium ion secondary battery, it is important to ensure the safety of the battery as described below in detail. For the purpose of ensuring the safety of the lithium ion secondary battery, it has conventionally been practiced to provide a lithium ion secondary battery having various types of protective means, such as a temperature fuse, a current fuse and a PTC element, so as to prevent occurrence of the temperature elevation at an accident, such as an accident in which a short-circuiting between the cathode and the anode occurs due to a malfunctioning of the circuit or the like. Further, it has also conventionally been practiced to provide a lithium ion secondary battery having a safety valve so as to prevent occurrence of the elevation of the internal pressure of the battery.

However, it is possible that the short-circuiting of the battery occurs at various accidents other than the above-mentioned malfunctioning of a circuit or the like. For example, when the battery suffers accidents, such as an accident in which the battery casing is crushed by an external pressure and an accident in which the battery is overcharged by a malfunctioning of a charging circuit or the like, the separator disposed between the cathode and the anode Is broken or melted, causing a short-circuiting between the cathode and the anode in the battery. When the battery suffers an accident in which the battery casing (which serves as an anode) is penetrated with a conductive member, such as a metallic nail or the like, a short-circuiting occurs between the cathode and the iron nail penetrating the casing as the anode. Further, when the battery suffers an accident in which the battery is exposed to heat from an external high-temperature heat source, the separator disposed between the cathode and the anode is melted sooner than the metals used in the cathode and the anode, thereby causing a short-circuiting between the cathode and the anode. With respect to the battery which is in the non-charged state or the completely discharged state, such a battery is free from the above-mentioned disadvantages. However, with respect to the battery which is in the charged state, the above-mentioned advantageous characteristics of the battery (such as high capacity and high voltage) rather adversely affect the safety of the battery. That is, from the viewpoint of safety, the lithium ion secondary battery in the charged state is rather inferior to other types of batteries. The reason for this is considered to be as follows. In a lithium ion secondary battery, as a cathode active material, use is made of a composite metal oxide of lithium, a transition metal and optionally a non-transition metal, such as $LiCoO_2$. The above-mentioned composite metal oxide used as a cathode active material has a relatively high resistance. Therefore, when the short-circuit current passes through the cathode active material, the temperature of the cathode active material is easily elevated. In addition, when the battery is In the charged state, the composite metal oxide (cathode active material) is in the unstable state in which a certain amount of lithium atoms are liberated from the composite metal oxide In the form of lithium ions. When the temperature of such a cathode active material is elevated, the cathode active material are likely to decompose to generate active oxygen. Therefore, there is a danger that the generated active oxygen vigorously reacts with an aluminum foil (a current collector for the cathode) coated with the cathode active material and/or with an organic solvent used in the non-aqueous electrolyte, thereby rapidly elevating the temperature of the battery.

Therefore, it has been desired to develop a non-aqueous battery exhibiting high safety, in which occurrence of the short-circuiting between the cathode active material and the anode or occurrence of the temperature elevation caused by such a short-circuiting can be suppressed even when the battery suffers accidents, such as an accident in which the battery casing is crushed by an external pressure, an accident in which the battery is overcharged by a malfunctioning of a charging circuit or the like, an accident in which the battery is penetrated with a metallic nail or the like, and an accident in which the battery is exposed to heat from an external high-temperature heat source

SUMMARY OF THE INVENTION

The present inventor has made extensive and intensive studies with a view toward developing a non-aqueous battery which is free from the above-mentioned problems accompanying the conventional non-aqueous battery. As a result, it has unexpectedly been found that a specific non-aqueous battery as defined below exhibits high safety even at various accidents. Such a non-aqueous battery comprises (1) a casing, (2) a non-aqueous electrolyte contained in a space defined by an inner wall of the casing, and (3) a spirally wound electrode assembly accommodated in the above-mentioned space, operatively with the non-aqueous electrolyte, wherein the spirally wound electrode assembly comprises a cathode (comprising a cathode active material layer), an anode (comprising an anode active material layer) and a separator which are spirally wound together into a spirally wound structure so that the cathode active material layer and the anode active material layer are arranged opposite to each other through the separator, and wherein the battery has a cathode-equipotential metallic segment provided in association with the cathode, in which the cathode-equipotential metallic segment has on at least one side thereof a portion free of a cathode active material layer to provide a cathode-equipotential, exposed metallic portion longitudinally extending over a length of one wind or more of the spirally wound structure, wherein the cathode-equipotential, exposed metallic portion is positioned opposite to an anode-equipotential, exposed metallic portion which is provided, in association with the anode, over a length of one wind or more of the spirally wound structure. By virtue of such a unique construction of the non-aqueous battery, even when the battery suffers accident in which the casing of the battery is crushed by an external pressure, thereby causing the separator (disposed between the cathode and the anode) to be broken at a plurality of portions thereof simultaneously, the battery undergoes simultaneously a short-circuiting between the cathode-equipotential, exposed metallic portion free of the cathode active material and the anode-equipotential, exposed metallic portion free of the anode active material. Since the short-circuit resistance between the exposed metallic portions is very low, as compared to the short-circuit resistance between the cathode active material and anode, most of the short-circuit current flows through the short-circuiting portion between the exposed metallic portions, whereas almost no short-circuit current flows through the cathode active material, in accordance with the current distribution between the different short-circuiting portions which is in inverse proportion to the resistance of the respective short-circuiting portion. That is, even when the above-mentioned battery suffers accidents as mentioned above, a safe internal short-circuiting occurs without being accompanied by disadvantageous phenomena, such as rapid heat generation which results In the rapid temperature elevation of the battery. Further, it has also been found that the above-mentioned effects can be achieved by the non-aqueous battery having accommodated in a casing thereof a stacked laminate electrode assembly or a zigzag-folded laminate electrode assembly, wherein each of the electrode assemblies has substantially the same structure as in the above-mentioned spirally wound electrode assembly, so that it has a cathode-equipotential, exposed metallic portion and an anode-equipotential, exposed metallic portion. The present invention has been completed, based on these novel findings.

Accordingly, it is an object of the present invention to provide a non-aqueous battery exhibiting high safety, which is free from the occurrence of rapid heat generation which results in the rapid temperature elevation of the battery, and which Is made, based on a quite novel idea to so design a battery that, even when the battery suffers accidents, such as an accident in which the casing of the battery is crushed by an external pressure, an accident in which the battery is overcharged by a malfunctioning of a charging circuit or the like, an accident in which the battery is penetrated with a conductive member, such as a metallic nail, and an accident in which the battery is exposed to heat from external high-temperature heat source, the battery is adapted to be easily subject to short-circuiting between metallic segments, i.e., a cathode-equipotential, exposed metallic portion and an anode-equipotential, exposed metallic portion.

The foregoing and other objects, features and advantages of the present invention will be apparent from the following detailed description taken in connection with the accompanying drawings and the appended claims.

DESCRIPTION OF THE REFERENCE NUMERALS

Figure 1:
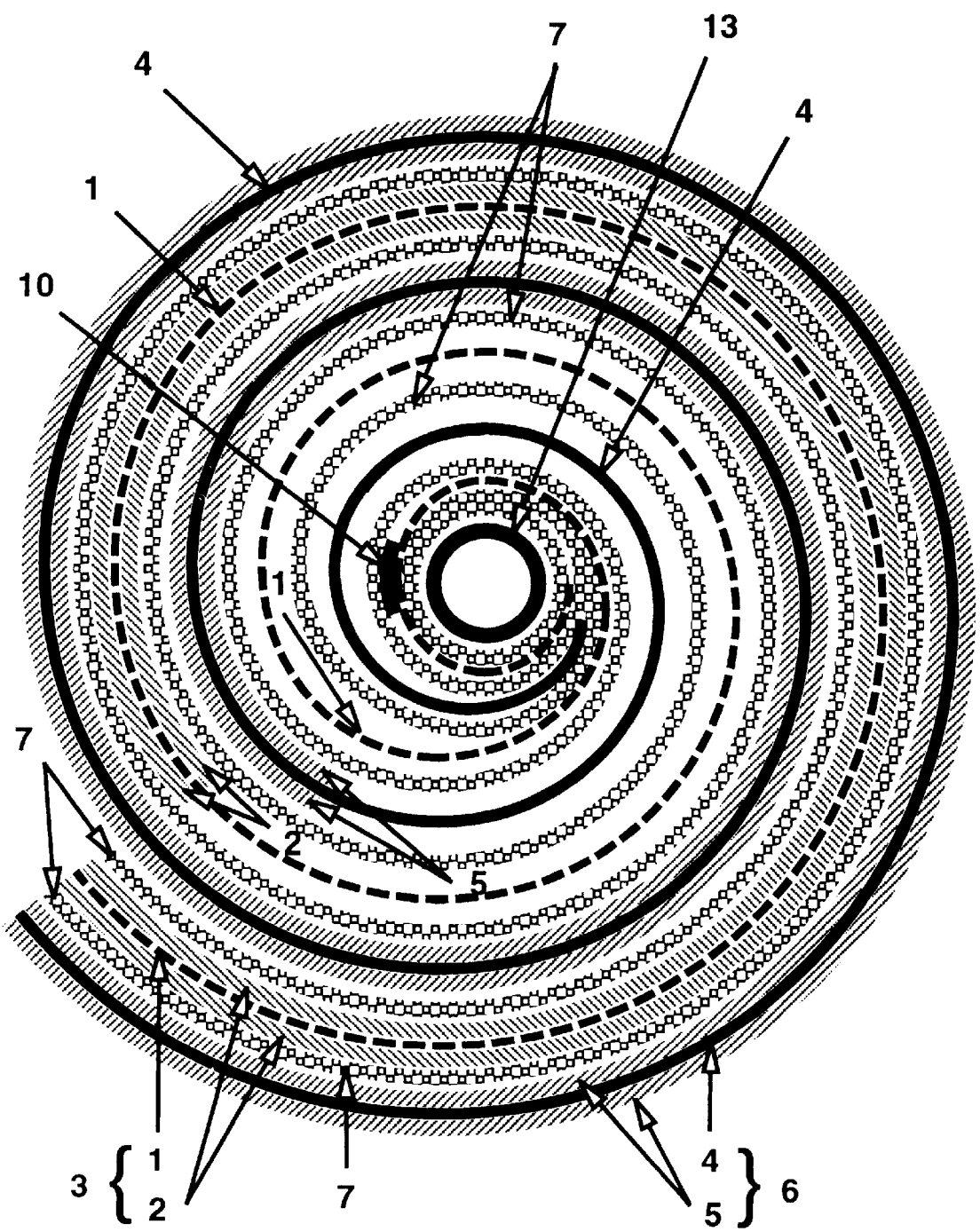
FIG. 1 is a diagrammatic cross-sectional view of a non-aqueous battery according to one embodiment of the present invention, which has a spirally wound electrode assembly

1: Cathode metallic foil
2: Cathode active material layer
3: Cathode
4: Anode metallic foil
5: Anode active material layer
6: Anode
7: Separator made of an ion-transmitting separator material
8: Casing
9: Metallic extension from a cathode metallic foil
10: Cathode tab
11: Metallic extension from an anode metallic foil
12: Anode tab
13: Tubular core
14: Core having a slit
15: Separator made of an ion-insulating separator material
16: Separator made of a material having a relatively low melting temperature
17: Separator having a thickness smaller than that of separator 7 above
18: Electrically conductive, rigid or elastic member
19: Iron nail

DETAILED DESCRIPTION OF THE PRESENT INVENTION

In one aspect of the present invention, there is provided a non-aqueous battery comprising: (1) a casing, (2) a non-aqueous electrolyte contained in a space defined by an inner wall of the casing, and (3) a spirally wound electrode assembly accommodated in the space, operatively with the non-aqueous electrolyte, the spirally wound electrode assembly (3) comprising:

a cathode comprising (a-1) a cathode metallic foil capable of serving as a cathode current collector, and (a-2) a cathode active material layer formed on at least one side of the cathode metallic foil (a-1), an anode comprising an anode active material layer, and a separator disposed between the cathode and the anode, the cathode, the anode and the separator being spirally wound together into a spirally wound structure, wherein the cathode active material layer and the anode active material layer are arranged opposite to each other through the separator, the battery having a cathode-equipotential metallic segment provided in association with the cathode, wherein the cathode-equipotential metallic segment has on at least one side thereof a portion free of a cathode active material layer to provide a cathode-equipotential, exposed metallic portion ($\alpha$) longitudinally extending over a length of one wind or more of the spirally wound structure, the cathode-equipotential, exposed metallic portion ($\alpha$) being positioned opposite to an anode-equipotential, exposed metallic portion ($\beta$), which portion ($\beta$) is provided, in association with the anode, over a length of one wind or more of the spirally wound structure.

In the present invention, the term "cathode-equipotential, exposed metallic portion" is intended to mean an exposed metallic portion having an equipotential to the potential of the cathode. Likewise, the term "anode-equipotential, exposed metallic portion" used herein is intended to mean an exposed metallic portion having an equipotential to the potential of the anode.

With respect to the non-aqueous battery of the present invention, detailed explanation is made below.

As mentioned above, according to one embodiment of the present invention, the non-aqueous battery of the present invention comprises (1) a casing, (2) a non-aqueous electrolyte contained in a space defined by an inner wall of the casing, and (3) a spirally wound electrode assembly accommodated in the space, operatively with the non-aqueous electrolyte. In the above-mentioned battery, the spirally wound electrode assembly (3) comprises a cathode comprising (a-1) a cathode metallic foil capable of serving as a cathode current collector, and (a-2) a cathode active material layer formed on at least one side of the cathode metallic foil (a-1), an anode comprising an anode active material layer, and a separator disposed between the cathode and the anode. The cathode, the anode and the separator are spirally wound together into a spirally wound structure, wherein the cathode active material layer and the anode active material layer are arranged opposite to each other through the separator.

The characteristic feature of the non-aqueous battery according to this embodiment of the present invention, which has a spirally wound electrode assembly, resides in that the battery has a cathode-equipotential metallic segment provided in association with the cathode, wherein the cathode-equipotential metallic segment has on at least one side thereof a portion free of a cathode active material layer to provide a cathode-equipotential, exposed metallic portion ($\alpha$) longitudinally extending over a length of one wind or more of the spirally wound structure, wherein the cathode-equipotential, exposed metallic portion ($\alpha$) is positioned opposite to an anode-equipotential, exposed metallic portion ($\beta$), which portion ($\beta$) is provided, in association with the anode, over a length of one wind or more of the spirally wound structure.

In the present invention, it is preferred that the above-mentioned anode comprises (b-1) an anode metallic foil capable of serving as an anode current collector, and (b-2) an anode active material layer formed on at least one side of the anode metallic foil (b-1), or comprises (b-3) an anode active material metallic foil capable of serving as an anode active material layer and as an anode current collector and optionally (b-4) an anode current collector metallic foil attached, on at least one side thereof, to the anode active material metallic foil (b-3) with electrical connection with the anode current collector metallic foil.

Further, in the present invention, it is preferred that the above-mentioned anode-equipotential, exposed metallic portion (β) is at least one member selected from the group consisting of: (c) an exposed metallic portion of at least one side of the anode metallic foil (b-1), wherein the exposed metallic portion is free of anode active material layer (b-2); (d) an exposed metallic portion of at least one side of the anode active material metallic foil (b-3); (e) an exposed metallic portion of at least one side of anode current collector metallic foil (b-4), wherein the exposed metallic portion is free of anode active material metallic foil (b-3) as the anode active material layer; and (f) a metallic extension having electrical connection with and extending from at least one end selected from innermost and outermost ends of anode metallic foil (b-1), anode active material metallic foil (b-3) or anode current collector metallic foil (b-4)

In the present invention, it is preferred that the battery has a construction in which the above-mentioned cathode-equipotential, exposed metallic portion (α) is at least one member selected from the group consisting of: (g) an exposed metallic portion of at least one side of the cathode metallic foil (a-1) at an outermost end portion thereof, wherein the exposed metallic portion is free of cathode active material layer (a-2); and (h) a metallic extension having electric connection with and extending from an outermost end of cathode metallic foil (a-1).

By virtue of the above-mentioned construction of the battery, the battery has, for example, the following advantages. Even when the battery having a metallic casing serving as an anode suffers an accident in which the casing is penetrated with a conductive member, such as a metallic nail, from the outside of the battery, the conductive member penetrating the casing as the anode also penetrates a separator, so that a low resistance short-circuiting occurs between the conductive member penetrating the anode casing [the inner wall of which functions as an anode-equipotential, exposed metallic portion (β) as explained below] and the cathode-equipotential, exposed metallic portion (α) which is free of a cathode active material layer. Further, even when the battery suffers an accident in which the battery is exposed to heat from an external high-temperature heat source, a short-circuiting safely occurs in the battery without suffering a large temperature elevation of the battery for the following reason. In the above-mentioned battery, the outermost one-wind separator layer in the electrode assembly is closer to the casing than the other portions of the separator. Therefore, when the battery is exposed to heat, the above-mentioned outermost one-wind separator layer is caused to melt sooner than the other portions of the separator, so that a low resistance short-circuiting occurs between the cathode-equipotential, exposed metallic portion (α) and the metallic anode casing, whereas almost no current flows through the cathode active material. In the battery having the above-mentioned construction, the anode-equipotential, exposed metallic portion (α) [which is positioned opposite to the above-mentioned cathode-equipotential, exposed metallic portion (α)] is not limited to the anode casing, and may, for example, be an exposed portion of the anode metallic foil.

With respect to the casing, the casing may serve either as a cathode or as an anode. Accordingly, the inner wall of the casing serving as a cathode can serve as a cathode-equipotential, exposed metallic portion (α), or, alternatively, the inner wall of the casing serving as an anode can serve as an anode-equipotential, exposed metallic portion (β). Further, the above-mentioned casing may be made of a plastic material, so that the casing serves neither as a cathode nor as an anode. In this case, the plastic casing can be provided with an outside electrode.

In the present invention, it is also preferred that the battery has a construction in which the above-mentioned cathode-equipotential, exposed metallic portion (α) is at least one member selected from the group consisting of (g') an exposed metallic portion of at least one side of cathode metallic foil (a-1) at an innermost end portion thereof, wherein the exposed metallic portion Is free of cathode active material layer (a-2), and (h') a metallic extension having electric connection with and extending from an innermost end of the cathode metallic foil (a-1).

The battery having the above-mentioned construction has the following advantages. When the battery sustains a compressive force and is slowly crushed, the innermost portion of the spirally wound electrode assembly sustains high pressure, as compared to the other portions of the spirally wound electrode assembly (the reason for this resides in that the winding diameters of the innermost portion of the electrode assembly are smaller than those of the other portions of the electrode assembly), so that the portion of the separator positioned in the innermost portion of the electrode assembly is lively to be broken sooner than the other portions of the separator. Therefore, in this battery, a low resistance short-circuiting rapidly and surely occurs between the cathode-equipotential, exposed metallic portion (α) and the anode-equipotential, exposed metallic portion (β). For this reason, even when a high resistance short-circuiting thereafter occurs between the cathode active material layer and the anode, each having a high resistance, the short-circuit current does not flow through a portion where such a high resistance short-circuiting occurs, to thereby prevent the occurrence of a temperature elevation of the cathode active material and achieve a safe internal short-circuiting in the battery.

In the battery of the present invention, with respect to the length of an opposing portion in the spirally wound electrode assembly at which the cathode-equipotential, exposed metallic portion (α) is positioned opposite to the above-mentioned anode-equipotential, exposed metallic portion (β), the larger the length of the opposing portion, the more effective for improving the safety of the battery. Therefore, it is preferred that the length of the opposing portion is as large as possible. However, when the length of the opposing portion is too large, the discharge capacity of the battery is likely to become low. Therefore, it is preferred that the opposing portion is present in the spirally wound electrode assembly over a length of from one to ten winds, more preferably from two to four winds.

Further, it is preferred that the battery of the present invention has a construction in which the above-mentioned cathode-equipotential, exposed metallic portion (α) has on both sides thereof a portion free of a cathode active material layer over a length of one wind or more. The battery having such a construction is advantageous in that, even when the battery suffers an accident, such as an accident in which the battery is crushed by an external pressure within a very short period of time, so that breakage of the separator (which is disposed between the cathode and anode) occurs at various portions thereof almost simultaneously, or an accident in which the current collector foil is penetrated at plurality of portions thereof with a conductive member having a sharp tip end, such as an iron nail, a low resistance short-circuiting surely occurs between both exposed metallic portions.

In the present invention, the battery may have a construction in which the above-mentioned cathode-equipotential, exposed metallic portion (α) has an electrode tab for cathode-equipotentially connecting the cathode to an outside electrode disposed externally of the spirally wound electrode assembly.

The battery having such a construction is advantageous in the following points. When the battery suffers an accident In which the battery is overcharged by a malfunctioning of a charging circuit or the like, a large amount of a current is caused to flow through the electrode tab, so that the temperature of a portion just around the electrode tab becomes higher than the temperatures of the other portions in the battery. As a result, a portion of the separator which is positioned between the electrode tab and the anode-equipotential, exposed metallic portion (β) is caused to melt sooner than the other portions of the separator to thereby cause a low resistance short-circuiting between the cathode-equipotential, exposed metallic portion (α) (having the electrode tab provided thereon) and the anode-equipotential, exposed metallic portion (β). Therefore, in the battery having the above-mentioned construction, a short-circuiting safely occurs without suffering a large temperature elevation in the battery which is caused due to a thermal decomposition of the cathode active material or the like.

However, in the case of a short-circuiting between the anode-equipotential, exposed metallic portion (β) and an outside electrode (such as a cathode casing) which is cathode-equipotentially connected to the cathode through an electrode tab at its weld portion having a slight resistance [wherein the outside electrode functions as cathode-equipotential, exposed metallic portion (α)], It is likely that the short-circuit resistance is not satisfactorily low, as compared to the short-circuit resistance in the short-circuiting between the anode-equipotential, exposed metallic portion (β), and the above-mentioned exposed metallic portion (g) or (g') and/or the above-mentioned metallic extension (h) or (h').

Further, the battery of the present invention may have a construction in which the above-mentioned anode-equipotential, exposed metallic portion (β) has an electrode tab for anode-equipotentially connecting the anode to an outside electrode disposed externally of the spirally wound electrode assembly.

The battery having such a construction is advantageous in the following points. When the battery suffers an accident in which the battery is overcharged by a malfunctioning of a charging circuit or the like, a large amount of a current is caused to flow through the electrode tab, so that the temperature of a portion just around the electrode tab becomes higher than the temperatures of the other portions in the battery As a result, a portion of the separator which is positioned between the electrode tab and the cathode-equipotential, exposed metallic portion (α) is caused to melt sooner than other portions of the separator to thereby cause a low resistance short-circuiting between the cathode-equipotential, exposed metallic portion (α) and the anode-equipotential, exposed metallic portion (β) (having the electrode tab provided thereon). Therefore, in the battery having the above-mentioned construction, a short-circuiting safely occurs without suffering a large temperature elevation in the battery which is caused due to a thermal decomposition of the cathode active material or the like.

However, in the case of a short-circuiting between the cathode-equipotential, exposed metallic portion (α) and an outside electrode (such as an anode casing) which is anode-equipotentially connected to the anode through an electrode tab at its weld portion having a slight resistance [wherein the outside electrode functions as anode-equipotential, exposed metallic portion (β)], it is likely that the short-circuit resistance is not satisfactorily low, as compared to the short-circuit resistance in the short-circuiting between the cathode-equipotential, exposed metallic portion (α) and at least one member selected from the exposed metallic portions (c) to (e) and the metallic extension (f).

As the above-mentioned metallic extension having electric-connection with and extending from an innermost and/or outermost end of the current collector metallic foil, use can be made of, for example, a metallic foil made of the same metal as used in the current collector metallic foil, which has substantially the same width as that of the current collector metallic foil and a thickness which is 5 to 20 times that of the current collector metallic foil, and which is mechanically connected to the innermost and/or outermost end of the current collector metallic foil by welding or the like so that the metallic extension has electrical connection with the current collector metallic foil and the resistance at a joint portion thereof is low. The metal used for the above-mentioned metallic extension may be different from the metal used. for the current collector metallic foil. In this case, however, it is preferred to use a metal which can be easily connected to a current collector metallic foil by welding or the like.

With respect to the thickness of the current collector metallic foil, for effectively utilizing the space defined by the inner wall of the casing to thereby increase the capacity of the battery, it is desired that the thickness is as small as possible, as long as the metallic foil can exhibit sufficient electric conductivity and mechanical strength to serve as a current collector. For example, in the case of a compact battery, use is generally made of a metallic foil having a thickness of from 10 to 20 µm. With respect to the above-mentioned metallic extension, for achieving a low resistance short-circuiting at the metallic extension (serving as an exposed metallic portion), it is desired that the thickness of the metallic extension is not too small. For this reason, and also from the viewpoint of ease in handling, it is desired that the metallic extension Is formed of a metallic foil having a thickness of from 50 to 200 µm, which is mechanically connected to an outermost and/or innermost end of the current collector metallic foil by welding or the like so that the metallic extension has electrical connection with the current collector metallic foil and the resistance of a Joint portion thereof is low.

The above-mentioned electrode tab means a connector which electrically connect a cathode and/or anode of the spirally wound electrode assembly to an outside electrode provided on the casing. Generally, in the case of a compact battery, a metallic sheet having a width of 3 to 5 mm and a thickness of 100 to 200 µm is used as an electrode tab. The metallic sheet as an electrode tab can be connected to the cathode-equipotential, exposed metallic portion (α) and/or the anode-equipotential, exposed metallic portion (β) by resistance welding or ultrasonic welding.

With respect to the material for the electrode tab, use can be made of the same metals as those used in the current collectors for the cathode and the anode. Specific examples of metals usable as materials for the cathode tab include aluminum, titanium, nickel and stainless steel. Specific examples of metals usable for the anode tab include copper, nickel and stainless steal.

With respect to the separator, there is no particular limitation, and conventional battery separators can be used.

However, in the present invention, it is preferred that the separator is composed of a first separator segment ($S_1$) and a second separator segment ($S_2$) as described below.

In the above-mentioned separator, the first separator segment ($S_1$) is positioned in at least one first region in which the cathode active material layer of the cathode is positioned opposite to the anode active material layer of the anode, and the second separator segment ($S_2$) is positioned in at least one second region in which the cathode-equipotential, exposed metallic portion ($\alpha$) is positioned opposite to the anode-equipotential, exposed metallic portion ($\beta$), wherein the first separator segment ($S_1$) is made of an ion-transmitting separator material and the second separator segment ($S_2$) is made of a separator material selected from the group consisting of an ion-insulating separator material and an ion-transmitting separator material.

With respect to the above-mentioned ion-transmitting separator material, there is no particular limitation. Examples of ion-transmitting materials include a woven fabric, a non-woven fabric, a glass fiber woven fabric and a microporous synthetic resin film. When it is intended to use a thin film electrode having a large surface area in the non-aqueous battery of the present invention, it is preferred to use, for example, the microporous synthetic resin film as disclosed in Unexamined Japanese Patent Application Laid-Open Specification No. 58-59072, more preferably the microporous polyolefine film as disclosed in U.S. Pat. No. 5,051,183, each of which is suitable for use in the above-mentioned thin film electrode in respect of the film thickness, film strength, film resistance.

In the present invention, it is preferred that the above-mentioned second separator scent ($S_2$) is made of an ion-insulating separator material for the reason described below in detail.

A segment of the separator, which is disposed at a location between the above-mentioned cathode-equipotential, exposed metallic portion ($\alpha$) and the above-mentioned anode-equipotential, exposed metallic portion ($\beta$), need not have an ion-transmitting property, because no electrochemical reaction occurs in that location.

With respect to the ion-insulating separator material, there is no particular limitation as long as it has no electronic conductivity and has high resistance to organic solvents.

Further, the above-mentioned second separator segment ($S_2$) may be made of an ion-transmitting separator material. Examples of ion-insulating separator materials include a woven fabric, a non-woven fabric, a glass fiber woven fabric and a microporous synthetic resin film. When it is intended to use a thin film electrode having a large surface area in the non-aqueous battery of the present invention, it is preferred to use, for example, the microporous synthetic resin film as disclosed in Unexamined Japanese Patent Application Laid-Open Specification No. 58-59072, more preferably the microporous polyolefine film as disclosed in U.S. Pat. No. 5,051,183, each of which is suitable for use in the above-mentioned thin film electrode in respect of the film thickness, film strength and film resistance.

The above-mentioned ion-insulating separator material is advantageous, as compared to the ion-transmitting separator material not only in respect of the cost but also in respect of the strength. Therefore, even when the thickness of such an ion-insulating separator material Is extremely small, it can exhibits a satisfactory strength. By the use of such a separator material having extremely small thickness in the battery, it becomes possible to increase the lengths of wound electrodes of the spirally wound electrode assembly, which can be accommodated in the battery per unit volume thereof.

In the present invention, it is preferred that the above-mentioned second separator segment has a melting temperature which is 100° C. or more, preferably from 100 to 200° C., and which is at least 5° C. lower than, preferably from 5 to 150° C. lower than the melting temperature of the above-mentioned first separator segment.

As mentioned above, the second separator segment [positioned in at least one second region in which the cathode-equipotential, exposed metallic portion ($\alpha$) is positioned opposite to the anode-equipotential, exposed metallic portion ($\beta$)] has a melting temperature lower than that of the first separator segment [positioned in at least one first region in which the cathode active material layer of the cathode is opposite to the anode active material layer of the anode]. Therefore, when the temperature inside the battery becomes high, the second separator segment (having a melting temperature lower than that of the first separator segment) is easily melted sooner than the first separator segment, so that a short-circuiting surely occurs between the cathode-equipotential, exposed metallic portion ($\alpha$) and the anode-equipotential, exposed metallic portion ($\beta$).

It is preferred that the melting temperature of the second separator segment is higher than the temperature at which a non-aqueous battery is generally used (from –20 to 100° C.), and that it is significantly lower than the melting temperature of the first separator segment (from 120 to 250° C.).

In this connection, when the difference between the melting temperature of the second separator segment and that of the first separator segment is less than 5° C., a disadvantage may be caused depending on the temperature distribution within the battery, wherein the first separator segment is occasionally caused to melt sooner than the second separator segment. On the other hand, when the difference between the melting temperature of the second separator segment and that of the first separator segment is more than 150° C., a disadvantage may be caused, wherein the second separator segment is occasionally caused to melt within the range of temperature at which a non-aqueous battery is generally used.

Examples of ion-insulating separator materials usable for the second separator segment include a polyethylene film and a polypropylene film.

In the present invention, it is preferred that the battery has a construction in which the spirally wound electrode assembly has in a spiral winding center portion thereof a rigid or elastic core inserted therein, so that when the casing of the battery sustains a compressive force, the electrode assembly is adapted to be compressed between the casing and the core.

The battery having the above-mentioned construction is advantageous especially when the battery has an opposing portion [at which the cathode-equipotential, exposed metallic portion ($\alpha$) is positioned opposite to the anode-equipotential, exposed metallic portion ($\beta$)] over a length of one wind or more from the innermost end of the spirally wound structure. Specifically, when the casing of such a battery sustains a compressive force, the portion of the separator, which is positioned in the above-mentioned opposing portion, can be easily broken, thereby causing a low resistance short-circuiting between the exposed metallic portions.

Examples of cathode metallic foils usable in the battery of the present invention include metallic foils each having a thickness of from 5 to 100 $\mu$m, such as an aluminum foil, a titanium foil and a stainless steel foil. Of these, an aluminum foil having a thickness of from 8 to 50 $\mu$m is preferred, and an aluminum foil having a thickness of from 10 to 30 $\mu$m is more preferred. With respect to the thickness of the cathode active material layer formed on at least one side of the cathode metallic foil, it is preferred that the thickness is from 30 to 300 μm, more preferably from 70 to 130 μm.

Examples of anode metallic foils usable in the battery of the present invention include a copper foil, a nickel foil and a stainless steel foil. Of these, a copper foil and a stainless steel foil are preferred. With respect to the thickness of the anode metallic foil, it is preferred that the thickness is from 6 to 50 μm, more preferably from 8 to 25 μm. With respect to the thickness of the anode active material layer formed on at least one side of the anode metallic foil, it is preferred that the thickness is from 30 to 300 μm, more preferably from 70 to 130 μm.

In the present invention, each of the cathode metallic foil and the anode metallic foil may be in various forms. For example, the metallic foil may be in the form of an expanded metal, a punched metal and a foamed metal. Alternatively, in the present invention, instead of the anode metallic foils, use can be made of a sheet of a material equivalent to metal in respect of conductivity, such as carbon cloth or carbon paper.

In the present invention, as a cathode active material, a composite metal oxide of an alkali metal (such as Li, Na and Ca) and a transition metal (such as Co, Ni, Mn, and Fe), and a composite metal oxide of an alkali metal, a transition metal and a non-transition metal can be used. Examples of composite metal oxides include a lithium-containing composite metal oxide having a lamellar structure and having the ability to electrochemically intercalate and deintercalate Li ions. Examples of lithium-containing composite metal oxides include $LiCoO_2$ as disclosed in Unexamined Japanese Patent Application Laid-Open Specification No. 55-136131 (corresponding to U.S. Pat. No. 4,357,215); $Li_xNi_yCo_{(1-y)}O_2$ as disclosed in Unexamined Japanese Patent Application Laid-Open Specification No. 3-49155; and $Li_xMn_2O_4$.

These compounds can be easily obtained by a calcination reaction of a lithium compound, such as lithium hydroxide, lithium oxide, lithium carbonate, lithium nitrate or the like, with a metal oxide, a metal hydroxide, a metal carbonate, a metal nitrate or the like and, if desired, with other metal compounds.

In present invention, as an anode active material, a carbonaceous material, such as a coke, a graphite, and an amorphous carbon, can be used. The above-mentioned carbonaceous material may be in various forms, such as crushed particles, lamellar particles and spherical particles. With respect to the type of carbonaceous material, there is no particular limitation, and various types of carbonaceous materials can be used. Examples of carbonaceous materials include a carbon or graphite material having a large surface area as disclosed in Unexamined Japanese Patent Application Laid-Open Specification No. 58-35881 (corresponding to U.S. Pat. No. 4,617,243), a calcination-carbonized product of a phenolic resin ant the like as disclosed in Unexamined Japanese Patent Application Laid-Open Specification No. 58-209864, and a calcination-carbonized product of a condensed polycyclic hydrocarbon compound as disclosed in Unexamined Japanese Patent Application Laid-Open Specification No. 61-111907 (corresponding to U.S. Pat. No. 4,725,422). Further, in the present invention, as an anode active material, a composite metal oxide or the like can be used. Alternatively, in the present invention, metallic lithium as such can be used as an anode (anode active material metallic foil), which can serve not only as an anode active material layer but also as an anode current collector.

With respect to the non-aqueous electrolyte used in the battery of the present invention, there is no particular limitation. The non-aqueous electrolyte can be prepared by dissolving the electrolyte as mentioned below in an organic solvent. Examples of electrolytes include $LiClO_4$, $LiBF_4$, $LiAsF_6$, $CF_3SO_3Li$, $(CF_3SO_3)_2N.Li$, $LiPF_6$, $LiI$, $LiAlCl_4$, $NaClO_4$, $NaBF_4$, $NaI$, $(n-Bu)_4N^+ClO_4$, $(n-Bu)_4N^+BF_4$ and $KPF_6$. It is preferred that the concentration of the electrolyte in the organic electrolytic liquid is from about 0.1 to about 2.5 mol/liter. Alternatively, in the present invention, a solid electrolyte can be used.

Examples of organic solvents include ethers, ketones, lactones, nitriles, amines, amides, sulfur compounds, chlorinated hydrocarbons, esters, carbonates, nitro compounds, phosphoric ester compounds and sulfolane compounds. Among the above-mentioned organic solvents, ethers, ketones, nitriles, chlorinated hydrocarbons, carbonates and sulfolane compounds are preferred, and cyclic carbonates are especially preferred. Specific examples of organic solvents include tetrahydrofuran, 2-methyltetrahydrofuran, 1,4-dioxane, anisole, monoglyme, acetonitrile, propionitrile, 4-methyl-2-pentanone, butyronitrile, valeronitrile, benzonitrile, 1,2-dichloroethane, γ-butyrolactone, di-methoxyethane, methyl formate, propylenene carbonate, ethylene carbonate, vinylene carbonate, dimethylformamide, dimethylsulfoxide, dimethylthioformamide, sulfolane, 3-methylsulfolane, trimethyl phosphate, triethyl phosphate, and mixtures thereof. The organic solvents usable in the present invention are not limited to those which are mentioned above.

Figure 9:
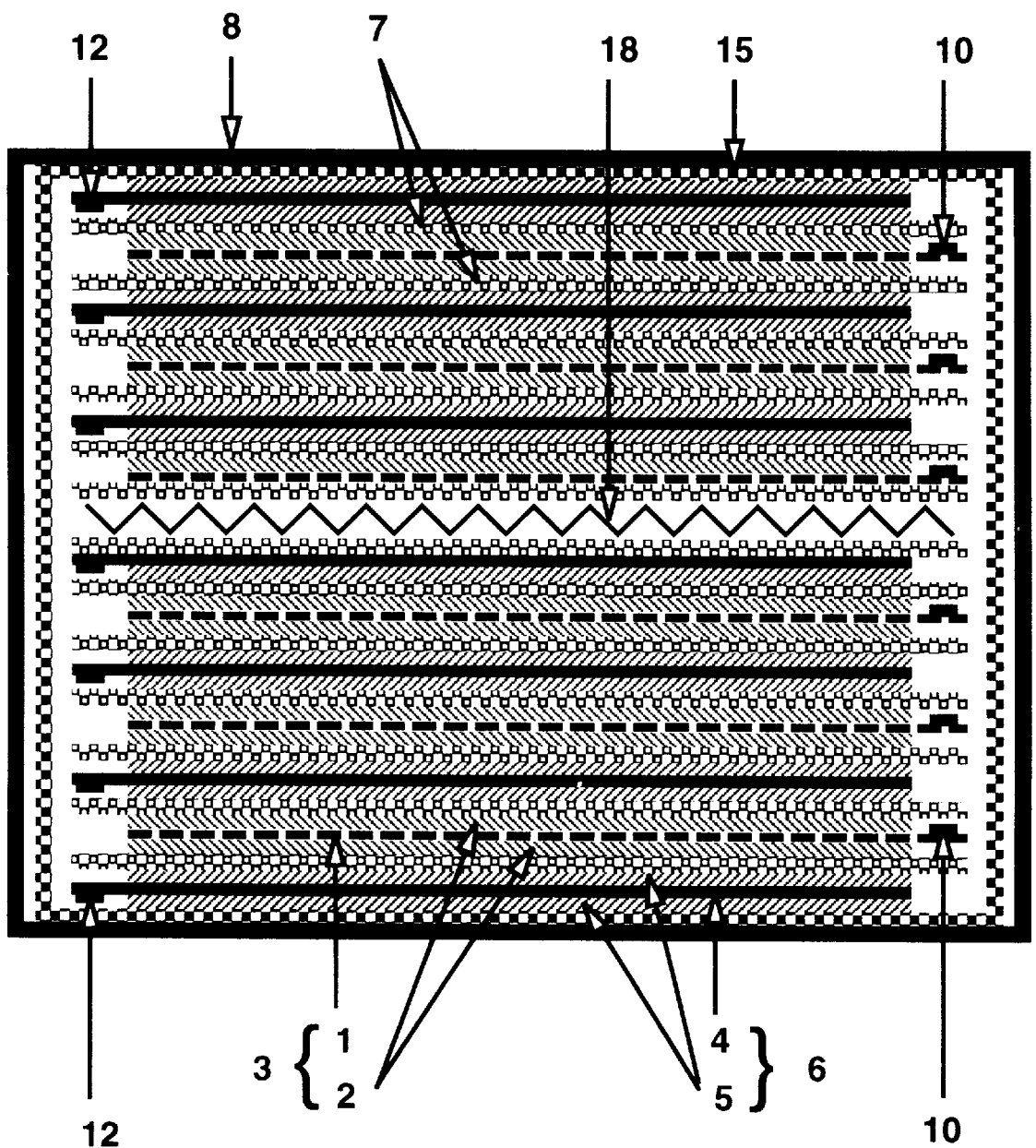
FIG. 9 is a diagrammatic cross-sectional view of a non-aqueous battery according to still a further embodiment of the present invention, which has a stacked laminate electrode assembly.
Figure 10:
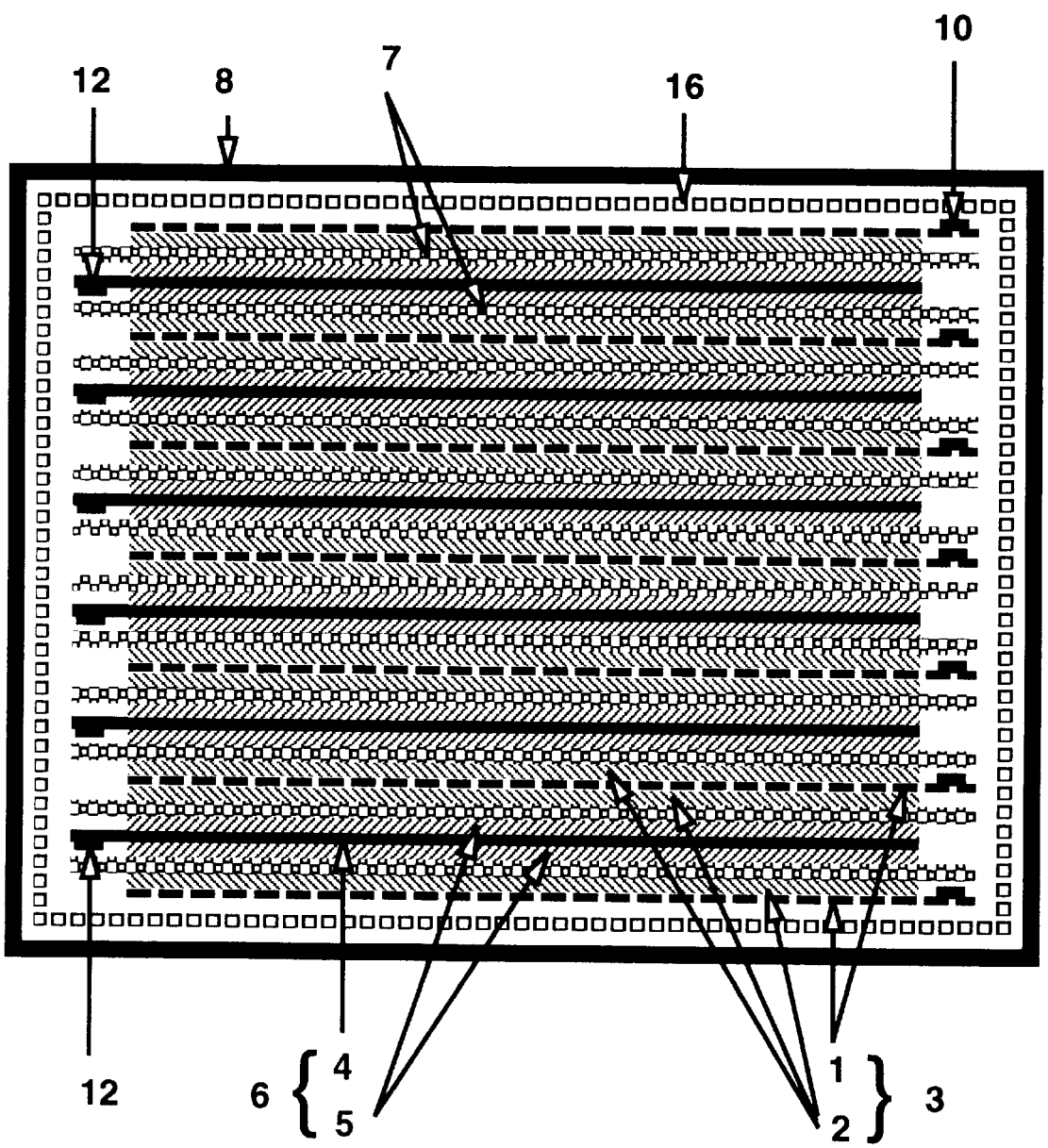
FIG. 10 is a diagrammatic cross-sectional view of a non-aqueous battery according to still a further embodiment of the present invention, which has a stacked laminate electrode assembly.
Figure 11:
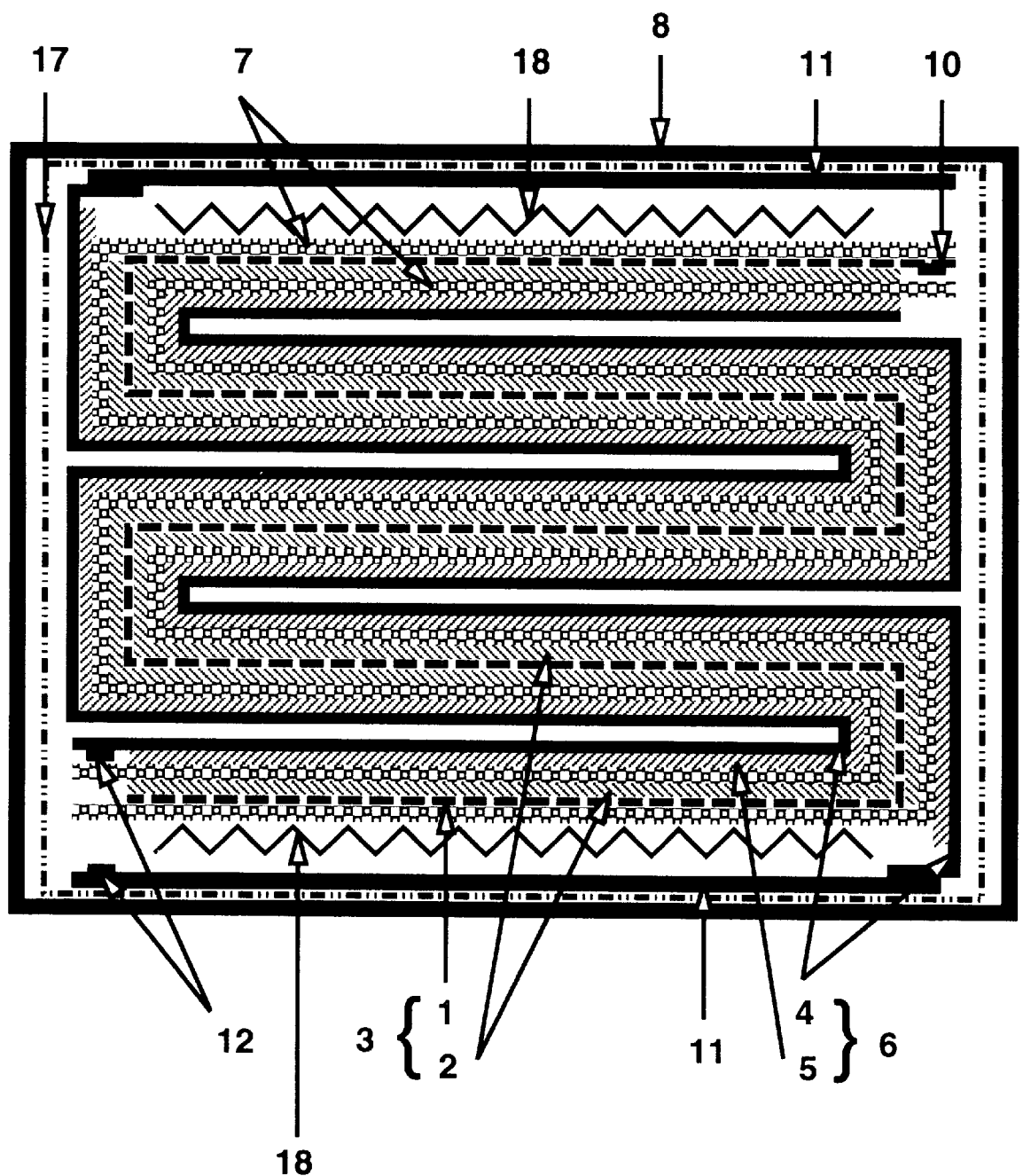
FIG. 11 is a diagrammatic cross-sectional view of a non-aqueous battery according to still a further embodiment of the present invention, which has a zigzag-folded laminate electrode assembly.
Figure 12:
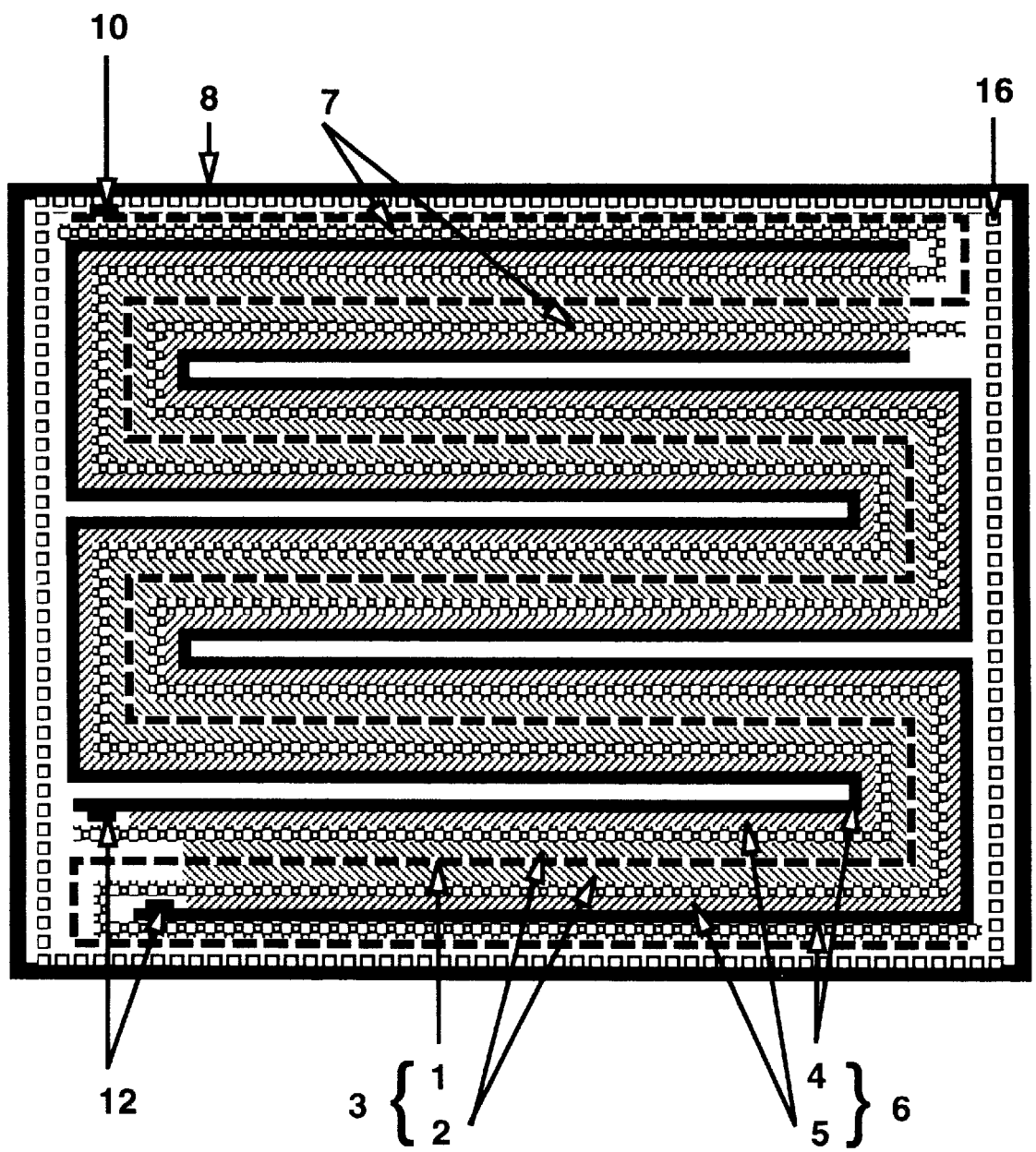
FIG. 12 is a diagrammatic cross-sectional view of a non-aqueous battery according to still a further embodiment of the present invention, which has a zigzag-folded laminate electrode assembly.

Explanation is made above with respect to the non-aqueous battery (as shown in FIGS. 1 to 8) according to one embodiment of the present invention, which has a spirally wound electrode assembly. Further, the same effects as in the above-mentioned non-aqueous battery having a spirally wound electrode assembly can be achieved by a non-aqueous battery having, in place of the above-mentioned spirally wound electrode assembly, a stacked laminate electrode assembly (as shown in FIGS. 9 and 10) or a zigzag-folded laminate electrode assembly (as shown in FIGS. 11 and 12), each having substantially the same structure as in the above-mentioned spirally wound electrode assembly, wherein it has a cathode-equipotential, exposed metallic portion and an anode-equipotential, exposed metallic portion.

That is, according to another embodiment of the present invention, there is provided a non-aqueous battery comprising: (1') a casing, (2') a non-aqueous electrolyte contained in a space defined by an inner wall of the casing, and (3') a stacked laminate electrode assembly accommodated in the space, operatively with the non-aqueous electrolyte, the stacked laminate electrode assembly (3') comprising:

a plurality of electrically connected cathodes, each comprising (a'-1) a cathode metallic foil capable of serving as a cathode current collector, and (a'-2) a cathode active material layer formed on at least one side of the cathode metallic foil (a'-1), a plurality of electrically connected anodes, each comprising an anode active material layer, and a plurality of separators, each disposed between each cathode and each anode, each cathode, each anode and each separator being stacked into a stacked laminate structure, wherein the cathode active material layer and the anode active material layer are arranged opposite to each other through the separator, the battery having a cathode-equipotential metallic segment provided In association with the cathode, wherein the cathode-equipotential metallic segment has on at least one side thereof a portion free of a cathode active material layer to provide a cathode-equipotential, exposed metallic portion (α') having a length of one layer or more of the stacked laminate structure, the cathode-equipotential, exposed metallic portion (α') being positioned opposite to an anode-equipotential, exposed metallic portion (β'), which portion (β') is provided in association with the anode, over a length of one layer or more of the stacked laminate structure.

Further, according to still another embodiment of the present invention, there is provided a non-aqueous battery comprising: (1") a casing, (2") a non-aqueous electrolyte contained in a space defined by an inner wall of the casing, and (3") a zigzag-folded laminate electrode assembly accommodated in the space, operatively with the non-aqueous electrolyte, the zigzag-folded laminate electrode assembly (3") comprising:

a cathode comprising (a"-1) a cathode metallic foil capable of serving as a cathode current collector, and (a"-2) a cathode active material layer formed on at least one side of the cathode metallic foil (a"-1), an anode comprising an anode active material layer, and a separator disposed between the cathode and the anode, the cathode, the anode and the separator being folded together into a zigzag-folded laminate structure, wherein the cathode active material layer and the anode active material layer are arranged opposite to each other through the separator, the battery having a cathode-equipotential metallic segment provided in association with the cathode, wherein the cathode-equipotential metallic segment has on at least one side thereof a portion free of a cathode active material layer to provide a cathode-equipotential, exposed metallic portion (α") having a length of one layer or more of the zigzag-folded laminate structure, the cathode-equipotential, exposed metallic portion (α") being positioned opposite to an anode-equipotential, exposed metallic portion (β"), which portion (β") is provided in association with the anode, over a length of one layer or more of the zigzag-folded laminate structure.

BEST MODE FOR CARRYING OUT THE INVENTION

Hereinbelow, the present invention will be described in more detail with reference to following embodiments, but they should not be construed as limiting the scope of the present invention.

FIG. 1 is a diagrammatic cross-sectional view of a non-aqueous battery according to one embodiment of the present invention (in FIG. 1, the casing of the battery is not shown). The non-aqueous battery shown in FIG. 1 has a spirally wound electrode assembly comprising cathode 3 [which comprises cathode metallic foil 1 (aluminum foil) and cathode active material layers 2, 2 formed on both surfaces of cathode metallic foil 1], anode 6 [which comprises anode metallic foil 4 (copper foil) and anode active material layers 5, 5 (each comprising a carbonaceous material) formed on both surfaces of anode metallic foil 4], and separator 7 (a microporous polyethylene film or the like) disposed between the above-mentioned cathode 3 and anode 6, wherein cathode 3, anode 6 and separator 7 are spirally wound together into a spirally wound structure, and wherein cathode active material layer 2 and anode active material layer 5 are arranged opposite to each other through separator 7. In FIG. 1, numeral 13 designates a tubular core made of stainless steel or the like. The tubular core is adapted to function as follows. When an elevation of the internal pressure of the battery occurs, the core serves to be a gas-release path, which leads a gas generated inside the battery to a safety valve so that the gas can be released out of the battery. Further, when the casing sustains a compressive force, the tubular core serves to ensure that the spirally wound electrode assembly is compressed between the casing and the core.

In the non-aqueous battery of this embodiment, cathode metallic foil 1 (aluminum foil) has, on both sides thereof, exposed metallic portions, which are free of cathode active material layers 2, 2, over a length of more than two winds from the innermost end of cathode metallic foil 1. Also, likewise, anode metallic foil 4 (copper foil) has, on both sides thereof, exposed metallic portions, which are free of anode active material layers 5, 5, over a length of more than one wind from the innermost end of anode metallic foil 4. That is, the spirally wound electrode assembly in the embodiment of FIG. 1 has a structure in which the following three regions are arranged in the following order from the innermost end of the assembly:

a first region in which aluminum foil 1 and copper foil 4 are arranged opposite to each other through separator 7 over a length of more than one wind of the spirally wound structure;

a second region in which aluminum foil 1 and anode active material layer 5 are arranged opposite to each other through separator 7 over a length of one wind of the spirally wound structure; and a third region in which cathode active material layer 2 and anode active material layer 5 are arranged opposite to each other through separator 7.

Figure 2:
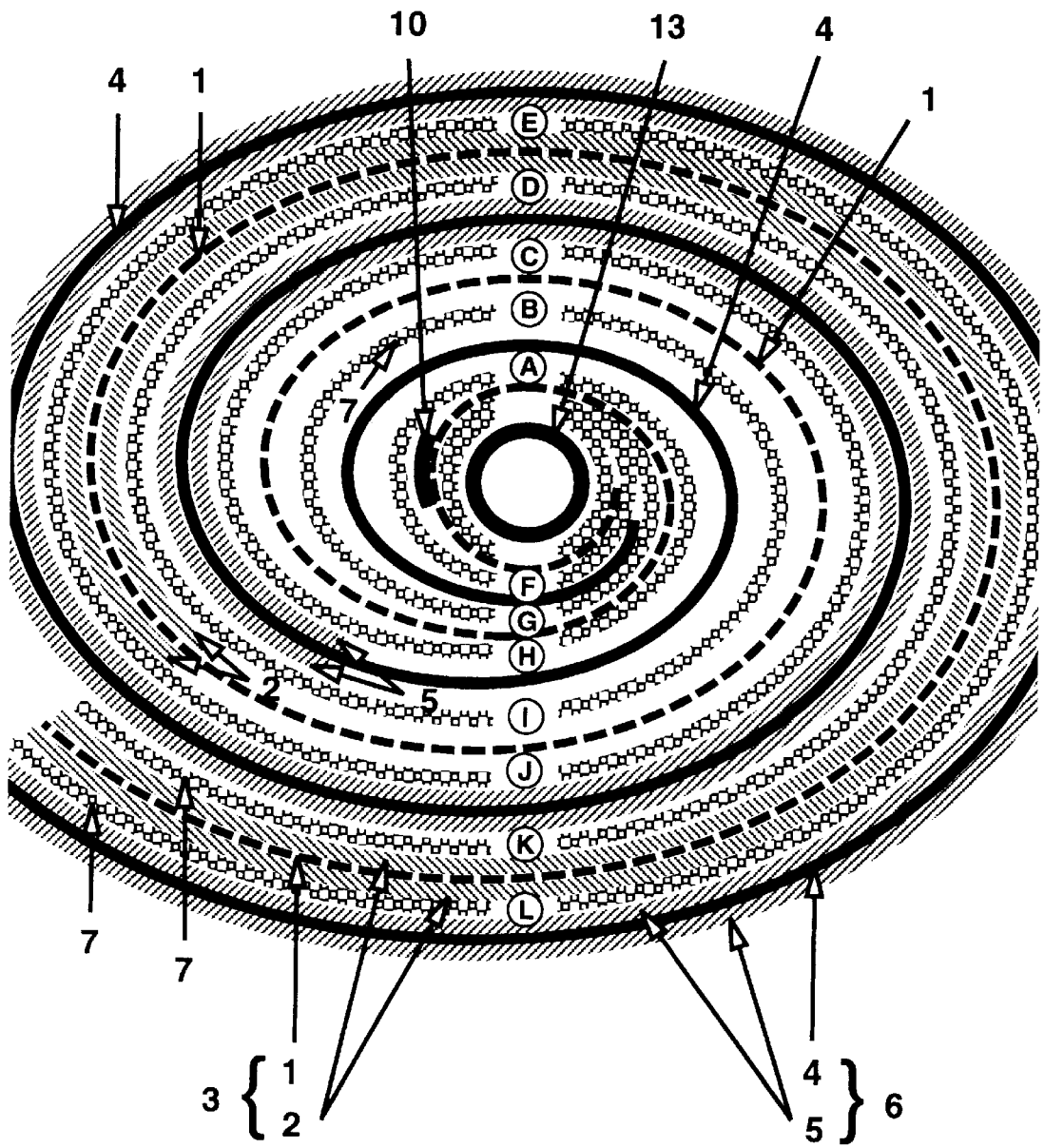
FIG. 2 is another diagrammatic cross-sectional view of the non-aqueous battery of FIG. 1, showing the state of the battery in which the battery is crushed by an external pressure.

When the non-aqueous battery of this embodiment sustains a pressure in two opposite directions from the upper and lower sides as viewed in FIG. 2, so that the battery is compressed and deformed as shown in FIG. 2, the innermost end portion of separator 7, which neighbors core 13, sustains a largest stress in the battery. Therefore, in this case, breakage of the spirally wound electrode assembly starts from the innermost end portion of separator 7 and spreads successively toward the outermost of the electrode assembly.

Specifically, as shown in FIG. 2, when the battery sustains a pressure in two opposite directions, first, a low resistance short-circuiting occurs at each of portions A and F between the exposed metal portion of aluminum foil 1 and the exposed metal portion of copper foil 4. Further, even when the breakage of separators 7, 7 occurs at a plurality of portions thereof (which are positioned on a line along which the pressure is applied to the battery) almost simultaneously, a short-circuiting safely occurs in the battery without generating much heat, for the following reasons. With respect to a short-circuiting occurring at each of portions A, B, F, G, H and I, wherein the short-circuiting occurs between metals having low resistance, the short-circuit resistance is considerably low, as compared to a short-circuit resistance at each of portions D, E, K and L, at which the short-circuiting occurs between cathode active material layer 2 having high resistance and anode active material layer 5. Therefore, when a short-circuiting occurs at any one of the above-mentioned low-resistance portions A, B, F, G, H and I, most of the short-circuit current flows through such a low-resistance portion, whereas the amount of the short-circuit current flowing through the above-mentioned high-resistance portions D, E, K and L is very small. At each of portions A, B, F, G, H and I, a low resistance short-circuiting occurs between cathode metallic foil 1 (aluminum foil) and anode metallic foil 4 (copper foil), wherein cathode active material layer 2 having high resistance is not present between the above-mentioned two metallic foils undergoing short-circuiting. As a result, the short-circuiting safely occurs in the battery with generation of only the Joule heat due to the short-circuiting, without suffering a large temperature elevation in the battery which is caused due to a thermal decomposition of the cathode active material or the like.

When it is assumed that the breakage of separators 7, 7 occurs almost simultaneously at various portions thereof including the innermost and outermost end portions, a portion of the cathode at which the cathode metallic foil (aluminum foil) is to be exposed is not necessarily limited to the innermost end portion of the cathode, and may be the outermost end portion of the cathode or a portion intermediate between the innermost end and outermost end of the cathode.

When the short-circuiting occurs between an exposed portion of aluminum foil 1 and anode active material layer 5, as indicated by characters C and J in FIG. 2, the short-circuit current does not flow through cathode active material layer 2, so that the short-circuiting does not cause a large temperature elevation in the battery which is due to a thermal decomposition of the cathode active material or the like. In this case, the short-circuit resistance is low, as compared to a short-circuit resistance in the short-circuiting through cathode active material layer 2 having high resistance. However, the short-circuit resistance in the short-circuiting between the exposed portion of aluminum foil 1 and anode active material layer 5 is not satisfactorily low, as compared to the short-circuit resistance in the short-circuiting between metals. Therefore, especially when a short-circuiting between cathode active material layer 2 and anode active material layer 5 occurs at another location almost simultaneously with the short-circuiting between the exposed portion of aluminum foil 1 and anode active material layer 5, a temperature elevation of the battery cannot be satisfactorily prevented.

In each of FIGS. 1 and 2, numeral 10 designates an electrode tab which is provided on the exposed portion of aluminum foil 1 so as to connect cathode 3 to an outside electrode through the electrode tab. The function of electrode tab 10 is as follows. Electrode tab 10 is provided on the exposed portion of aluminum foil 1 so as to be positioned opposite to the exposed portion of copper foil 4 through separator 7, wherein cathode active material layer 2 is not present between the above-mentioned two exposed portions. When the battery is overcharged by a malfunctioning of a charging circuit or the like, a large amount of current is caused to flow through electrode tab 10, so that the temperature of portions just around electrode tab 10 becomes higher than that of other portions in the battery. As a result, a portion of separator 7 which is positioned between electrode tab 10 and the exposed portion of copper foil 4 is caused to melt sooner than the other portions of separator 7 to thereby cause a low resistance short-circuiting between the exposed portion of cathode aluminum foil 1 (having electrode tab 10 provided thereon) and the exposed portion of anode copper foil 4, so that the short-circuiting safely occurs in the battery without suffering a large temperature elevation In the battery which is caused due to a thermal decomposition of the cathode active material or the like. In addition, in the battery shown in FIGS. 1 and 2, since the cathode-equipotential, exposed metallic portion is positioned at the innermost end portion of aluminum foil 1 (cathode metallic foil) of the spirally wound structure and has electrode tab 10 provided thereon, heat generated at electrode tab 10 by an overcharge of the battery is accumulated at the central portion of the spirally wound electrode assembly, so that a portion of separator 7 which corresponds to the exposed portion of cathode aluminum foil 1 having electrode tab 10 provided thereon is rapidly and surely melted, as compared to a battery in which the cathode-equipotential, exposed metallic portion is positioned at a portion other than the innermost end portion of cathode aluminum foil 1 of the spirally wound structure.

Further, also in a battery in which an electrode tab (not shown) is provided on the exposed portion of copper foil 4 positioned opposite to the exposed portion of aluminum foil 1 through separator 7, wherein the electrode tab serves to connect anode 6 to an outside electrode, the same advantage as achieved by the above-mentioned provision of electrode tab 10 on the exposed portion of aluminum foil 1 can be obtained. That is, when the battery is overcharged by a malfunctioning of a charging circuit or the like, a large amount of current is caused to flow through the electrode tab, so that the temperature of portions just around the electrode tab becomes higher than that of the other portions in the battery. As a result, a portion of separator 7, which is positioned between the electrode tab and the exposed portion of aluminum foil 1, is caused to melt sooner than the other portions of separator 7 to thereby cause a low resistance short-circuiting between the exposed portion of cathode aluminum foil 1 and the exposed portion of anode copper foil 4 (having the electrode tab provided thereon), so that the short-circuiting safely occurs in the battery without suffering a large temperature elevation in the battery which is caused due to a thermal decomposition of the cathode active material or the like.

In the battery of this embodiment, it is requisite that the spirally wound electrode assembly have a structure wherein the exposed portion of cathode metallic foil 1 (aluminum foil) and the exposed portion of anode metallic foil 4 (copper foil) are positioned opposite to each other through the separator over a length of one wind or more of the spirally wound structure from the innermost end thereof. By virtue of this structure, when the battery sustains a compressive force from the outside of the battery, the electrode assembly has, on a line along which the compressive force is applied, at least one portion which can surely undergo a low resistance short-circuiting between the exposed portion of cathode metallic foil 1 and the exposed portion of anode metallic foil 4, wherein the cathode active material is not present between the two exposed metallic portions of the cathode and anode.

Further, by coating the exposed portion of the cathode aluminum foil with a conductive coating (not shown) of graphite or the like, it becomes possible to prevent oxidation of the surface of the cathode aluminum foil so as to maintain a high conductivity of the aluminum foil. As a conductive coating, an anchor layer itself can be utilized (the anchor layer means a coating of graphite or the like which is coated on the aluminum foil, prior to the coating of a cathode active material, in order to improve the adhesion between the aluminum foil and the cathode active material).

Figure 3:
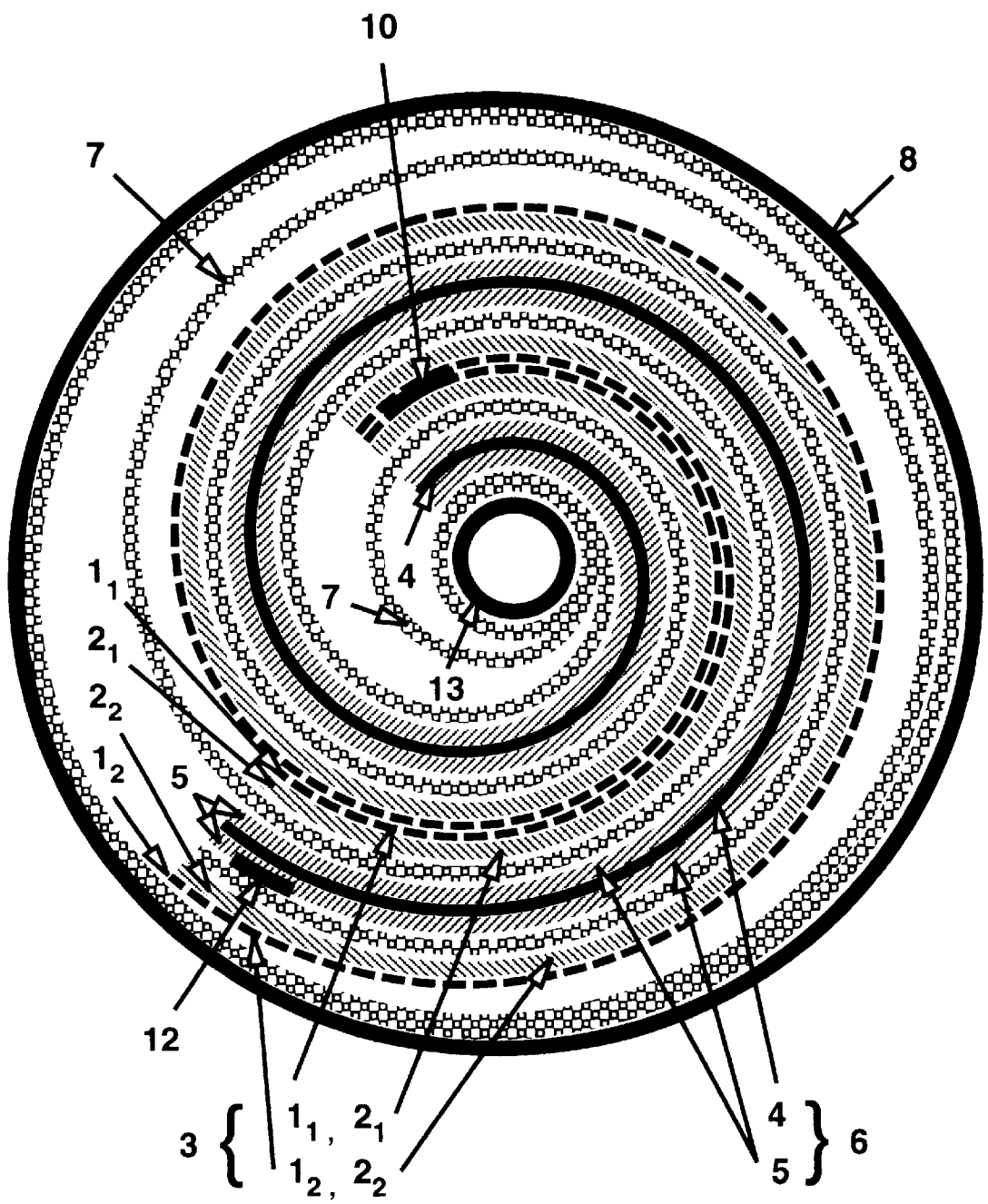
FIG. 3 is a diagrammatic cross-sectional view of a non-aqueous battery according to another embodiment of the present invention, which has a spirally wound electrode assembly.

FIG. 3 is a diagrammatic cross-sectional view of a non-aqueous battery according to another embodiment of the present invention. The non-aqueous battery shown in FIG. 3 comprises casing 8 serving as an outside anode, and a spirally wound electrode assembly accommodated in casing 8, which comprises cathode 3 [which comprises cathode metallic foil $1_1$ (aluminum foil) having cathode active material layer $2_1$ (comprising a lithium-containing composite oxide) formed on one side thereof and aluminum foil $1_2$ having cathode active material layer $2_2$ formed on one side thereof, wherein cathode metallic foils $1_1$ and $1_2$ are laminated so that the active material-free sides of the metallic foils face each other], anode 6 [which comprises anode metallic foil 4 (copper foil) having anode active material layers 5, 5 (each comprising a carbonaceous material) formed on both sides thereof], and separator 7 (a microporous polyethylene film or the like) disposed between the above-mentioned cathode 3 and anode 6, wherein cathode 3, anode 6 and separator 7 are wound together into a spirally wound structure, and wherein each cathode active material layer and each anode active material layer are arranged opposite to each other through separator 7.

In the non-aqueous battery shown in FIG. 3, a portion of cathode 3, which extends over the length of about one wind of the spirally wound structure from the outermost end of the spirally wound structure, has only aluminum foil $1_2$ (having cathode active material layer $2_2$ only on the inner side thereof), and does not have aluminum foil $1_1$ (having cathode active material layer $2_1$ only on the outer side thereof). That is, over the length of one wind from the outermost end of the spirally wound electrode assembly, the exposed portion of aluminum foil $1_2$ and the inner wall of anode casing 8 are arranged opposite to each other through separator 7. Cathode 3 having such a structure can be obtained by a method in which, in arranging aluminum foils $1_1$ and $1_2$, one foil is staggered by the length of one wind from the other foil.

Figure 4:
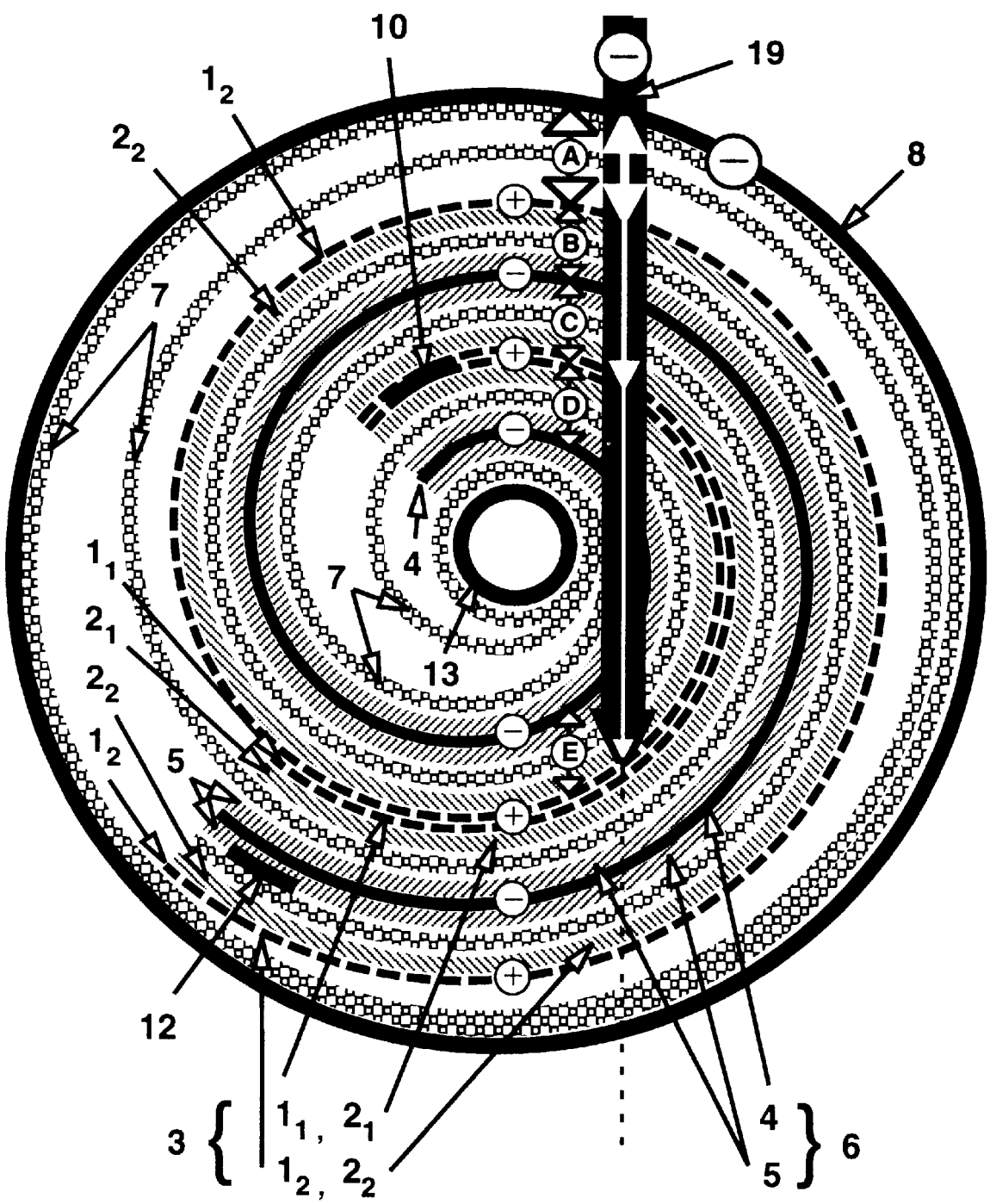
FIG. 4 is another diagrammatic cross-sectional view of the non-aqueous battery of FIG. 3, showing the state of the battery in which the battery has an iron nail penetrated thereinto.

When the non-aqueous battery of this embodiment suffers an accident as shown in FIG. 4 in which casing 8 and the spirally wound electrode assembly are penetrated with a conductive member, such as iron nail 19, a short-circuiting occurs in the battery as follows. The tip end of iron nail 19 penetrating casing 8 as an anode penetrates aluminum foil $1_2$ of cathode 3, cathode active material layer $2_2$, anode active material layer 5, copper foil 4, and so on. (the separator is omitted herein) in this order, thereby causing the short-circuiting at portions A, B, C, D and E in this order.

That is, as a result of the above-mentioned penetration of iron nail 19, a short-circuiting finally occurs between the cathode active material layer and the anode. However, a first short-circuiting at portion A occurs between iron nail 19 penetrating casing 8 and aluminum foil $1_2$ of cathode 3. With respect to the above-mentioned first short-circuiting occurring at portion A, wherein the short-circuiting occurs between metallic segments, the short-circuit resistance is satisfactorily low, as compared to the short-circuit resistance at each of portions B, C, D and E, wherein the short-circuiting occurs between iron nail 19 and the cathode active material. Therefore, most of the short-circuit current flows through portion A, wherein the short-circuiting occurs between casing 8 and aluminum foil $1_2$ through iron nail 19. As a result, a safe internal short-circuiting occurs without suffering a large temperature elevation in the battery.

Further, when the non-aqueous battery having the above-mentioned construction suffers an accident in which the battery is exposed to heat from an external high-temperature heat source, a short-circuiting safely occurs in the battery as follows. In the above-mentioned battery, the outermost one-wind of separator layer in the electrode assembly is closer to casing 8 than the other portions of the separator. Therefore, when the battery is exposed to heat, the above-mentioned outermost one-wind of separator layer is caused to melt sooner than the other portions of separator 7, so that a low resistance short-circuiting occurs between aluminum foil $1_2$ of cathode 3 and casing 8, whereas almost no current flows through the cathode active material.

FIGS. 5 to 8 respectively show diagrammatic cross-sectional views of non-aqueous batteries according to four different embodiments of the present invention, in which each of the non-aqueous batteries is so designed as to have both of the structural characteristics of the innermost end portion of the spirally wound electrode assembly used in the battery of FIG. 1 and the structural characteristics of the outermost end portion of the spirally wound electrode assembly used in the battery of FIG. 3.

Hereinbelow, explanation is made on the structures of the innermost and outermost end portions of the spirally wound electrode assembly and effects thereof with respect the four different batteries.

Figure 5:
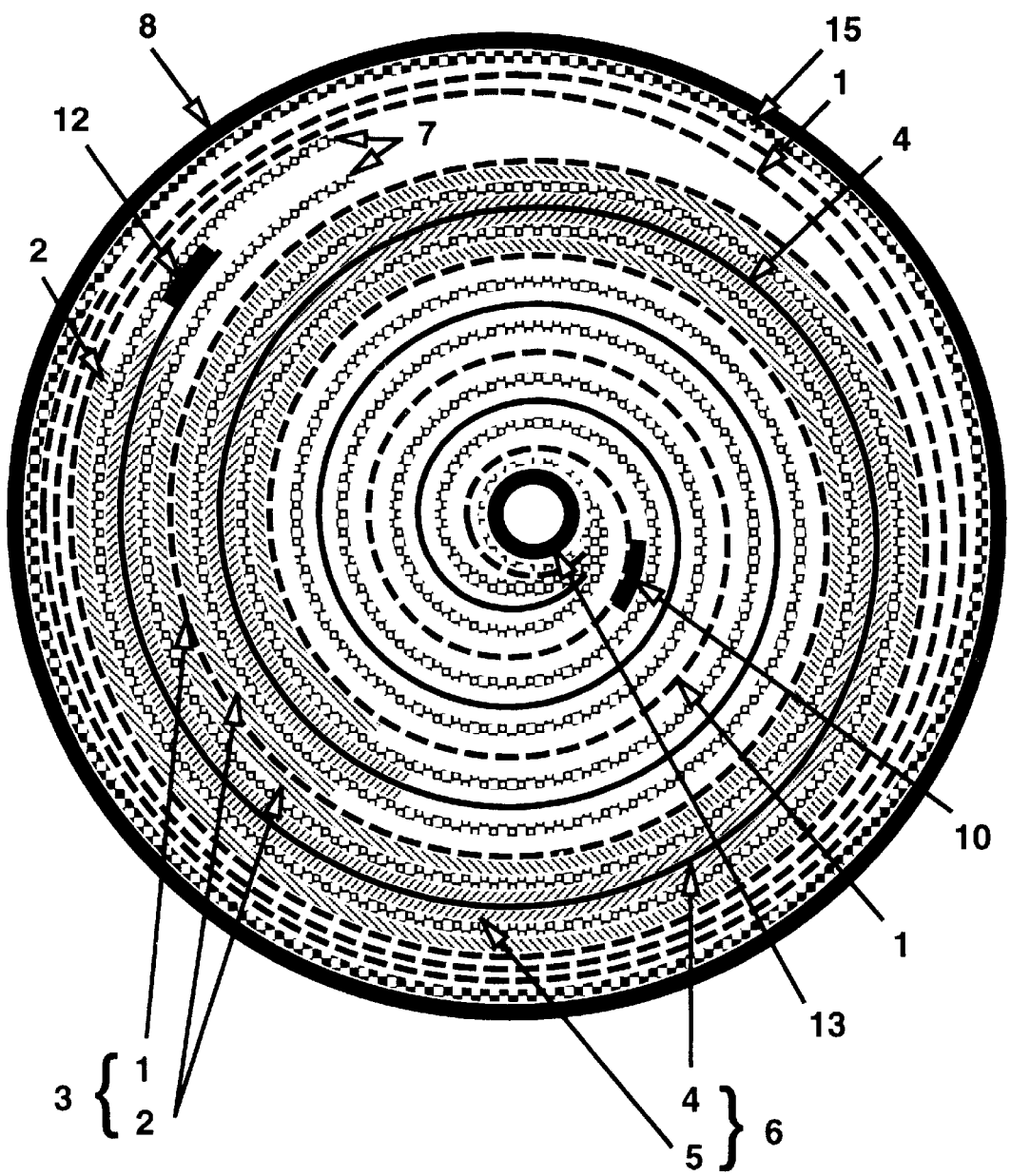
FIG. 5 is a diagrammatic cross-sectional view of a non-aqueous battery according to still another embodiment of the present invention, which has a spirally wound electrode assembly.

FIG. 5 is a diagrammatic cross-sectional view of a non-aqueous battery according to still a further embodiment of the present invention. In the non-aqueous battery of this embodiment, the innermost end portion of cathode metallic foil 1 (aluminum foil) of cathode 3 has a structure in which the following two regions are arranged in the following order from the innermost end of cathode aluminum foil 1: a first region in which cathode aluminum foil 1 has, on both sides thereof, exposed metallic portions, which are free of cathode active material layers 2, 2, over a length of about two winds; and a second region in which cathode aluminum foil 1 has, on one side thereof, an exposed metallic portion, which is free of cathode active material layer 2, over a length of about one wind. In each of the first and second regions of the innermost end portion of cathode aluminum foil 1, the exposed portion of aluminum foil 1 is arranged opposite to the exposed portion of copper foil 4, which is free of anode active material layers, through separator 7. Therefore, when separator 7 suffers breakage at the innermost end portion of the electrode assembly, a short-circuiting occurs between the exposed portion of cathode aluminum foil 1 and the exposed portion of anode copper foil 4.

Further, in the non-aqueous battery of this embodiment, the outermost end portion of cathode metallic foil 1 has a structure in which the following two regions are arranged in the following order from the outermost end of cathode aluminum foil 1: a first region in which cathode aluminum foil 1 has, on both sides thereof, exposed metallic portions, which are free of cathode active material layers 2, 2, over a length of about two winds: and a second region in which cathode aluminum foil 1 has, on one side thereof, an exposed metallic portion, which is free of cathode active material layer 2, over a length of about one wind.

In the first and second regions of the outermost end portion of cathode aluminum foil 1, three outermost aluminum foil layers are formed as shown in FIG. 5, wherein no separator is present between the respective exposed sides of the aluminum foil layers. In the battery of this embodiment, an exposed portion of cathode aluminum foil 1 which is positioned at the outermost end portion of the spirally wound structure is arranged opposite to an inner wall of the metallic casing serving as an anode (i.e., an anode-equipotential, exposed metallic portion) through separator 15 made of an ion-insulating separator material.

By virtue of the structure of the above-mentioned first and second region of the outermost end portion of cathode aluminum foil, even when the non-aqueous battery of this embodiment suffers an accident in which casing 8 and the spirally wound electrode assembly are penetrated with a conductive member having a sharp tip end, such as an iron nail, most of the short-circuit current is caused to flow between casing 8 and aluminum foil 1 through the iron nail (a conductive member) as in the case of the batteries of FIGS. 3 and 4. That is, even when the iron nail penetrates cathode active material layer 2 after occurrence of the short-circuiting between the iron nail and aluminum foil 1, to thereby cause the short-circuiting between the iron nail and cathode active material layer 2, the amount of the short-circuit current which flows through cathode active material layer 2 is satisfactorily low. As a result, a safe internal short-circuiting occurs in the battery without suffering a large temperature elevation in the battery which is caused due to a thermal decomposition of the cathode active material or the like.

Further, in the non-aqueous battery of this embodiment, as mentioned above, the separator made of an ion-insulating material is disposed between aluminum foil 1 and casing 8. The reason why the separator made of an ion-insulating material can be used resides in that no electrochemical reactions occur between aluminum foil 1 and casing 8, so that a separator to be disposed between aluminum foil 1 and the inner wall of casing 8 need not have an ionic conductivity. Therefore, as a separator disposed between aluminum foil 1 and the inner wall of casing 8, use can be made of a tough insulating film having no ion-transmitting property. The use of such a tough Insulating film as a separator is advantageous in the following points. During the production of a battery in which a tough insulating film separator is disposed between the inner wall of a casing and the electrode assembly, the process of insertion of the electrode assembly into the casing can be readily performed without a danger of impairing the separator by abrasion or the like. As a result, it becomes possible to suppress a danger of the occurrence of a defective battery which is likely to suffer a short-circuiting between the casing and the electrode assembly at an initial stage in practical use of the battery due to the impaired separator disposed between the inner wall of the casing and the electrode assembly.

Figure 6:
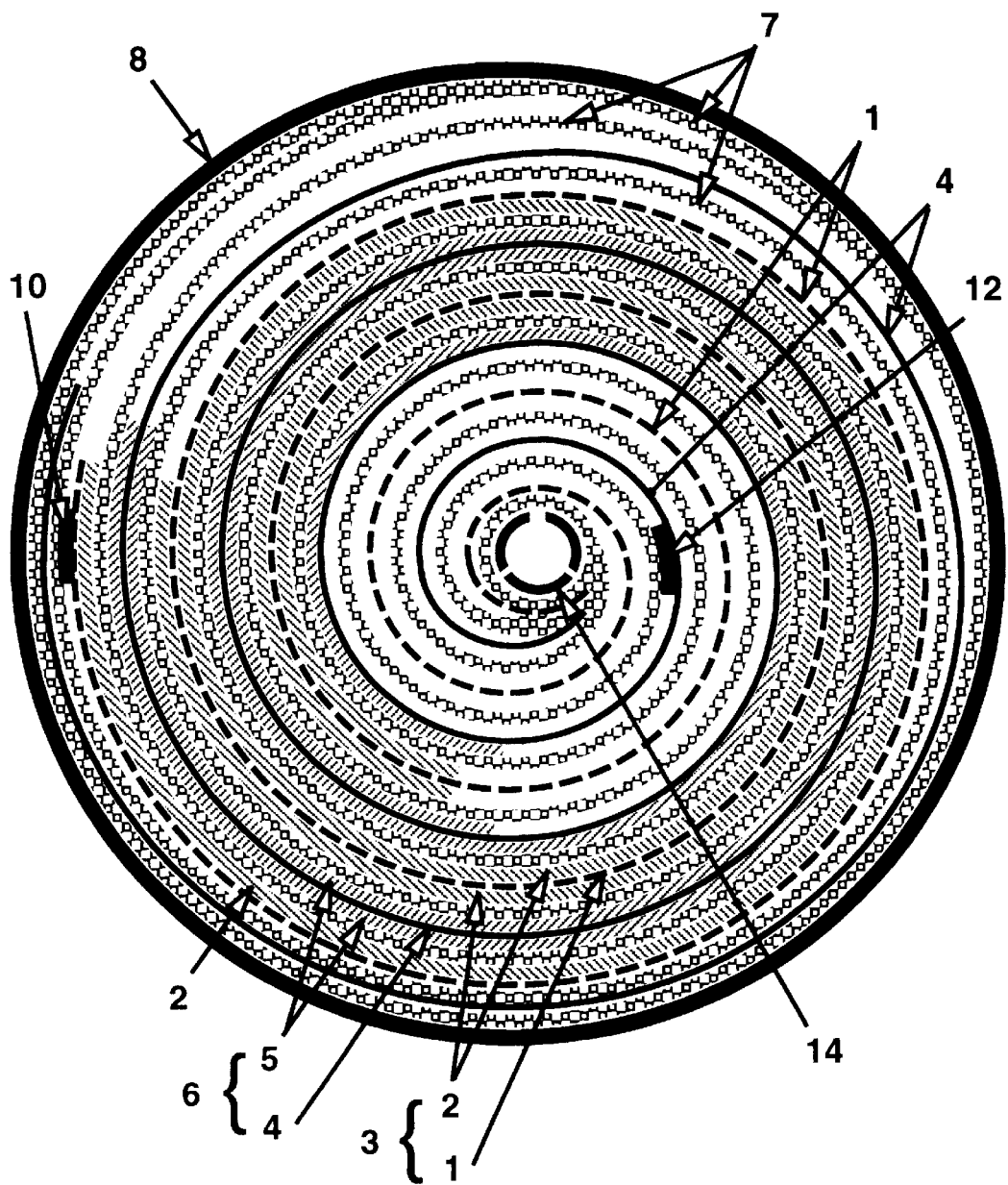
FIG. 6 is a diagrammatic cross-sectional view of a non-aqueous battery according to still a further embodiment of the present invention, which has a spirally wound electrode assembly.

FIG. 6 is a diagrammatic cross-sectional view of a non-aqueous battery according to still a further embodiment of the present invention. In the non-aqueous battery of this embodiment, the innermost end portion of cathode metallic foil 1 (aluminum foil) of cathode 3 has a structure in which the following two regions are arranged in the following order from the innermost end of cathode aluminum foil 1: a first region in which cathode aluminum foil 1 has, on both sides thereof, exposed metallic portions, which are free of cathode active material layers 2, 2, over a length of about two winds; and a second region in which cathode aluminum foil 1 has cathode active material layers on both sides thereof. In the first region of cathode aluminum foil 1, the exposed portion of aluminum foil 1 is arranged opposite to the exposed portion of copper foil 4, which is free of anode active material layers 2, 2, through separator 7. Therefore, when separator 7 suffers breakage at the center portion of the electrode assembly, a short-circuiting occurs between the exposed portion of cathode aluminum foil 1 and the exposed portion of anode copper foil 4.

Further, in the non-aqueous battery of this embodiment, the spirally wound electrode assembly of the battery has in a center portion thereof elastic core 14, which has a main slit extending along the longitudinal direction of the core so that the core has a C-shaped cross-section (core 14 shown in FIG. 6 is further provided with auxiliary slits as described below), instead of tubular core 13 used in the embodiment of The battery of this embodiment is designed to achieve the following effect. When the casing of the battery sustains a compressive force, the edges of the main slit of the core do work to pierce the innermost portion of the spirally wound electrode assembly and rapidly and surely break a portion of the separator which is positioned in the innermost portion of the electrode assembly, so that a low resistance short-circuiting rapidly and surely occurs between the exposed portion of cathode aluminum foil 1 and the exposed portion of anode copper foil 4.

With respect to the above-mentioned core 14 having a main slit, it is preferred that core 14 further has, at several portions thereof, auxiliary slits having a short length, as long as the provision of the auxiliary slits is controlled so that the toughness of the core is not disadvantageously lowered. In this case, by virtue of the increased number of the edges of slits, the above-mentioned effect (rapid and sure breakage of a portion of the separator which is positioned in the center portion of the electrode assembly) of core 14 can be enhanced, and this effect can be stably achieved, irrespective of the direction of the pressure sustained by the casing of the battery.

Further, substantially the same effect as mentioned above can be achieved by the use of a spiral structure (such as a screw and a spring) (not shown in FIG. 6) having protrusions of various shapes on the outer periphery thereof, instead of a core having slits.

In the non-aqueous battery of the embodiment of FIG. 6, the outermost end portion of aluminum foil 1 (cathode metallic foil 1 of cathode 3) has a structure in which aluminum foil 1 has, on one (outer) side thereof, an exposed metallic portion over a length of about one wind of the spirally wound structure from the outermost end of aluminum foil 1. Copper foil 4 of the anode has, on both sides thereof, exposed metallic portions over a length of about one wind of the spirally wound structure from the outermost end of copper foil 4. In this battery, the above-mentioned exposed portion of the outer side of aluminum foil 1 is arranged opposite to the exposed portion of the inner side of anode copper foil 4 (which has, on both sides thereof, exposed metallic portions over a length of about one wind from the outermost end of anode copper foil 4) through separator 7. When a portion of separator 7 which is positioned between the exposed portion of aluminum foil 1 and the exposed portion of copper foil 4 suffers breakage, a low resistance short-circuiting safely occurs between aluminum foil 1 and copper foil 4, wherein the effect of this short-circuiting is the same as in the case of the non-aqueous battery of the embodiment of FIG. 3.

As mentioned above, in the above-mentioned non-aqueous battery of the embodiment of FIG. 3, the outermost end portion of the spirally wound electrode assembly has a construction in which, over a length of about one wind of the spirally wound structure from the outermost end thereof, the exposed portion of aluminum foil 1 is arranged opposite to the inner wall of anode casing 8 through separator 7. However, the structure of the outermost end portion the electrode assembly of the non-aqueous battery of the present invention is not particularly limited to such a structure as shown in FIG. 3, and the above-mentioned effect (i.e., the achievement of a safe internal short-circuiting at the penetration of the battery casing with a conductive member, such as an iron nail) can also be achieved by a battery having a structure of the outermost end portion of the electrode assembly other than that in the battery of FIG. 3. Examples of other structures of the outermost end portion of the electrode assembly include not only the structure of FIG. 6, but also a structure in which an anode having an anode active material layer is present between the exposed portion of cathode aluminum foil 1 and the inner wall of anode casing 8 (in the latter, however, the effect achieved is slightly inferior).

Further, for example, when a battery, such as a battery of the embodiment of FIG. 6 [in which the outermost end portion of the spirally wound electrode assembly has a structure in which anode copper foil 4 (having no anode active material layer thereon) is present between the exposed portion of cathode aluminum foil 1 and the inner wall of casing 8], suffers an accident in which the battery casing is penetrated with a conductive member, a short-circuiting occurs between the exposed portion of aluminum foil 1 and the exposed side of anode copper foil 4, but not between the exposed portion of aluminum foil 1 and the inner wall of casing 8. Therefore, for achieving a low resistance short-circuiting at the above-mentioned accident, the casing of the above-mentioned battery need not be equipotential to the anode, and the casing may be made of a non-metal material, such a resin.

Further, in the battery of this embodiment, the outermost layer of the spirally wound electrode assembly is a layer of anode copper foil 4. Therefore, when a cathode casing which is equipotential to the cathode is used in the non-aqueous battery of this embodiment instead of the anode casing, the obtained battery has a construction in which the (outer) exposed side of the above-mentioned anode copper foil 4 is arranged opposite to the inner wall of the cathode casing through separator 7. Therefore, when such a battery suffers an accident in which the battery casing is penetrated with a conductive member, a short-circuiting safely occurs in the battery as in the case of the battery of the embodiment of FIG. 6 which has an anode casing.

Figure 7:
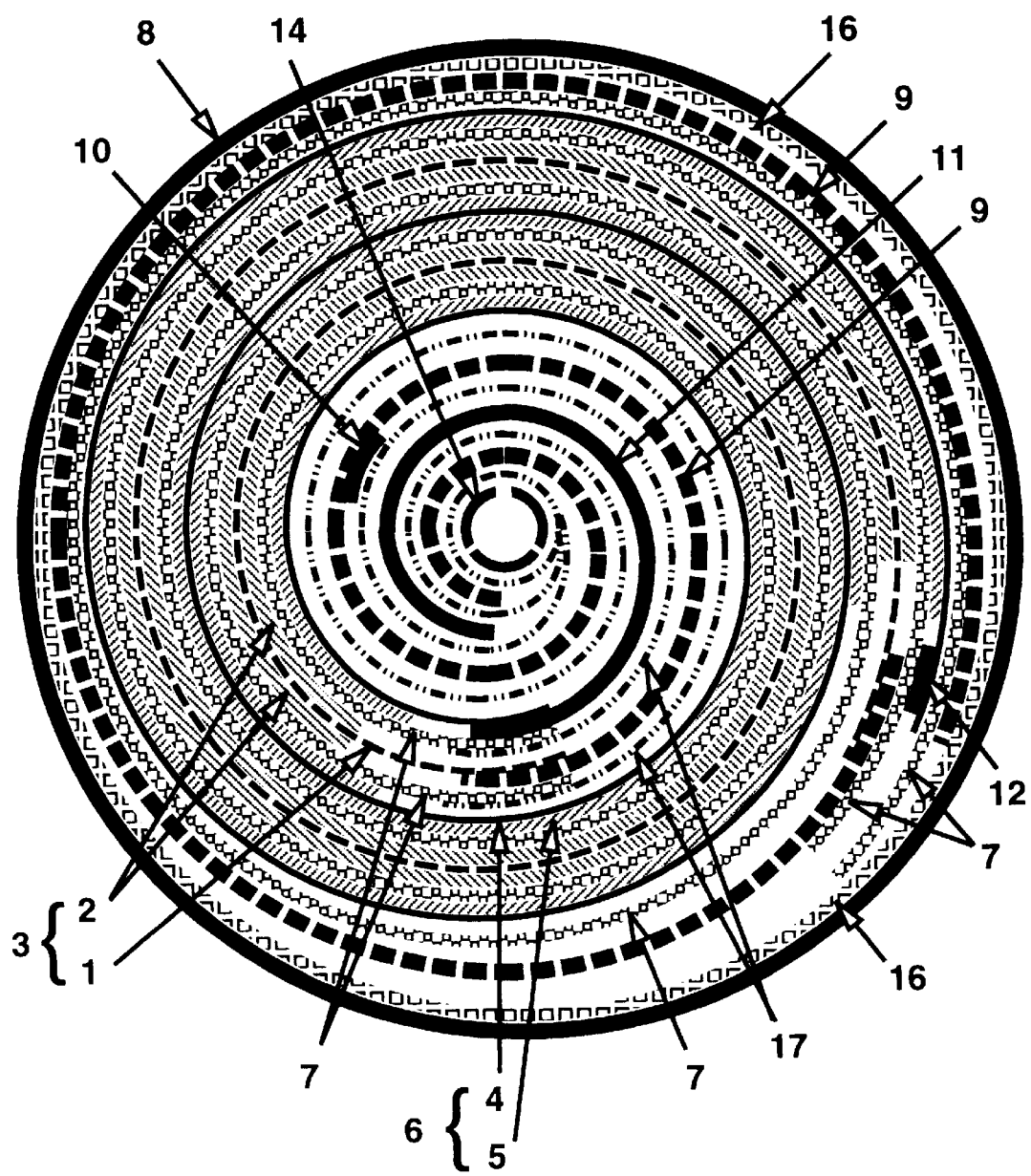
FIG. 7 is a diagrammatic cross-sectional view of a non-aqueous battery according to still a further embodiment of the present invention, which has a spirally wound electrode electrode assembly.

FIG. 7 Is a diagrammatic cross-sectional view of a non-aqueous battery according to still a further embodiment of the present invention. In the non-aqueous battery of this embodiment, to the innermost end portion of aluminum foil 1 (having a thickness of 15 $\mu$m) is mechanically connected aluminum foil 9 (which has no active material layer, and has a thickness of 100 $\mu$m and substantially the same width as that of aluminum foil 1), wherein aluminum foil 9 (extending from the innermost end of aluminum foil 1) is spirally wound over a length of about two winds, and has electrical connection with aluminum foil 1. Further, in the non-aqueous battery of this embodiment, to the innermost end of copper foil 4 (having a thickness of 18 $\mu$m) is mechanically connected copper foil 11 (which has no active material layer, and has a thickness of 100 $\mu$m and substantially the same width as that of copper foil 4), wherein copper foil 4 (extending from the innermost end of copper foil 11) is spirally wound over a length of about one wind, and has electrical connection with copper foil 4. In this battery, the innermost end portion of the spirally wound electrode assembly has a structure in which both sides of copper foil 11 are exposed and each exposed side is arranged opposite to an exposed side of aluminum foil 9 over a length of one wind from the innermost end of copper foil 11, and the exposed portion of copper foil 4 is arranged opposite to the exposed side of aluminum foil 9 over a length of one wind from the innermost end of copper foil 4.

Further, in the non-aqueous battery of this embodiment, stainless steel core 14 having slits is used, as in the non-aqueous battery of FIG. 6. Therefore, when the battery of the embodiment of FIG. 7 suffers an accident in which the battery casing sustains a compressive force, the edges of the slits of the core do work to pierce 100 $\mu$m-thick aluminum foil 9 and 100 $\mu$m-thick copper foil 11, thereby causing a short-circuiting therebetween. In this case, by virtue of the large thickness of each of aluminum foil 9 and copper foil 11, the short-circuit resistance is satisfactorily low, as compared to the short-circuit resistance at a short-circuiting between 15 $\mu$m-thick aluminum foil 1 and 18 $\mu$m-thick copper foil 4.

Further, in the non-aqueous battery of this embodiment, a separator which is made of an ion-insulating separator material and has a thickness smaller than that of separator 7 is disposed so that metallic extension 9 extending from cathode metallic foil 1 and each of anode metallic foil 4 and metallic extension 11 extending from anode metallic foil 4 are positioned opposite to each other through separator 7. Generally, a separator needs to have an ion-transmitting property so as to function as a battery, as well as an electron-insulating property. In addition, a separator has a large number of pores therein for retaining an electrolytic liquid therein, so that in order to maintain satisfactory mechanical strength, the thickness of the separator cannot be greatly reduced In this connection, however, it should be noted that with respect to a separator to be disposed between opposing exposed portions of the cathode metallic foil and the anode metallic foil in the non-aqueous battery of the present invention, the separator need not have such an ion-transmitting property as required for functioning as a battery separator, as long as the separator has an electron insulating property, so that the separator need not have pores and hence a separator having a small thickness can be freely used. Therefore, the space inside the casing of the battery can be effectively utilized, and it becomes possible to design a battery having an increased capacity without sacrificing the high safety of the battery.

As mentioned above, in the outermost end portion of the spirally wound electrode assembly of the non-aqueous battery of the embodiment shown in FIG. 7, aluminum foil 9, which is in a sheet form and has, on both sides thereof, exposed metallic portions free of cathode active material layers and which has a width substantially the same as that of aluminum foil 1 and a thickness of 100 $\mu$m, is electrically and mechanically connected to the outermost end of aluminum foil 1 having a thickness of 15 $\mu$m, wherein aluminum foil 9 is spirally wound over a length of about one wind of the spirally wound structure from the connected portion. The outermost end portion of anode copper foil 4 has, on one side thereof, an exposed metallic portion extending over a length of about one wind to the outermost end of copper foil 4. Aluminum foil 9 and the above-mentioned outermost exposed portion of anode copper foil 4 are positioned opposite to each other over a length of about one wind of the spirally wound structure, to thereby provide a portion in which the exposed metallic portions of the cathode and anode are arranged opposite to each other. In this case, when the casing can serve as an anode, the effects of the present invention can be enhanced. However, the casing of the battery is not particularly limited to a casing which can serve as an anode; and may be a casing which can serve as a cathode as in the non-aqueous battery of the embodiment shown in FIG. 6, or a non-metallic container made of a resin or the like, or a bag-like casing which is composed of a film.

In the non-aqueous battery of the embodiment as shown in FIG. 7, the outermost of the spirally wound electrode assembly is comprised of an exposed portion of an aluminum foil. The outermost of the spirally wound electrode assembly is covered with separator 16 which has a melting temperature lower than that of separator 7, and the entire structure is disposed in anode casing 8. When such a non-aqueous battery suffers an accident in which the battery is exposed to heat from an external high-temperature heat source, separator 16, which is positioned between the casing inner wall and the spirally wound electrode assembly and has a melting temperature lower than that of separator 7, is caused to melt sooner than separator 7 which is positioned between cathode active material layer 2 and anode active material layer 5, so that a low resistance short-circuiting first occurs between cathode aluminum foil 9 and anode casing 8. Therefore, a short-circuit current does not flow through the cathode active material, which has high resistance, so that the battery does not suffer a large temperature elevation, thereby ensuring the safety of the battery. As already mentioned above, such an excellent effect can also be achieved by the non-aqueous battery of the embodiment shown in FIG. 3 in which the outermost one-wind of separator 7 constitutes the outermost of the spirally wound electrode assembly. However, by using separator 16 (having a melting temperature lower than that of separator 7) for covering the electrode assembly as in the non-aqueous battery of the embodiment shown in FIG. 7, it becomes possible to more effectively achieve the above-mentioned excellent effect.

Figure 8:
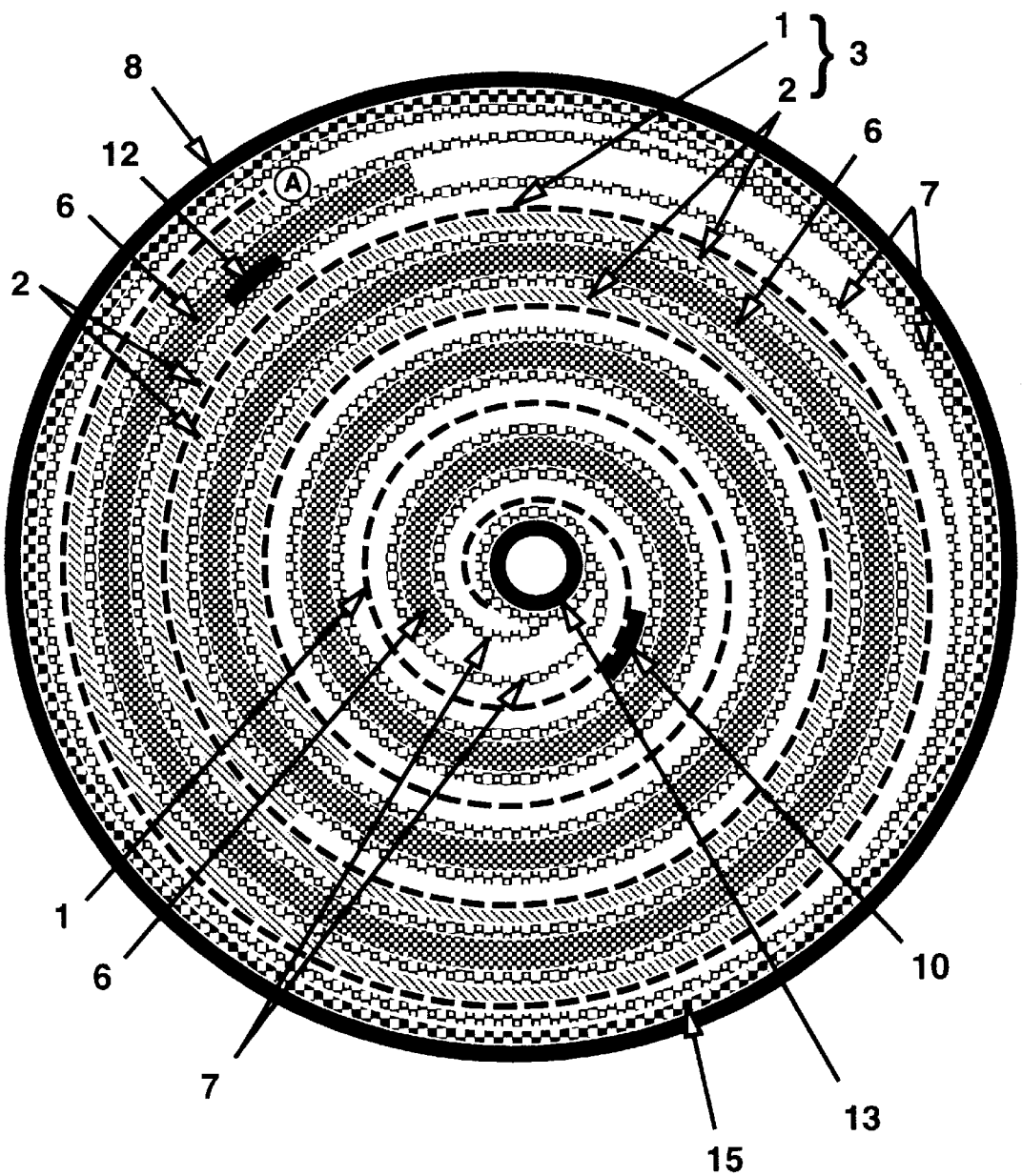
FIG. 8 is a diagrammatic cross-sectional view of a non-aqueous battery according to still a further embodiment of the present invention, which has a spirally wound electrode assembly.

FIG. 8 is a diagrammatic cross-sectional view of a non-aqueous battery according to still a further embodiment of the present invention. In the non-aqueous battery of this embodiment, the innermost end portion of cathode metallic foil 1 (aluminum foil) of cathode 3 has a structure in which the following two regions are arranged in the following order from the innermost end of cathode aluminum foil 1: a first region in which cathode aluminum foil 1 has, on both sides thereof, exposed metallic portions over a length of about two winds; and a second region in which cathode metallic foil 1 has, on one side thereof, an exposed metallic portion over a length of about one wind. In each of the first and second regions of the innermost end portion of cathode aluminum foil 1, the exposed portion of aluminum foil 1 is arranged opposite to anode metallic lithium foil 6 through separator 7. In this embodiment, the anode is a metallic lithium foil having a satisfactorily low electric resistance, so that it need not be additionally provided with a metallic foil current collector, such as a copper foil. When separator 7 is broken, a low resistance short-circuiting easily occurs between two metallic segments, i.e., anode metallic lithium foil 6 and cathode aluminum foil 1, so that the safety of the battery can be ensured.

Further, in the electrode assembly of the non-aqueous battery of this embodiment shown in FIG. 8, the outermost end portion of cathode aluminum foil 1 of cathode 3 has a structure In which cathode aluminum foil 1 has, on one (outer) side thereof, an exposed metallic portion extending over a length of about one wind to the outermost end thereof. This exposed portion of the outermost end portion of cathode aluminum foil 1 is arranged opposite to the metallic casing, which is equipotential to the anode, through separator which is made of an ion-insulating material.

In this battery, the mechanism for ensuring a safe, low resistance short-circuiting at an accident is almost the same as in the embodiment shown in FIG. 3. However, the safety mechanism of the battery of FIG. 8 is different from that of the battery of FIG. 3 in that the former has separator 15 made of an ion-insulating material. This point is explained below. The spirally wound electrode assembly of the battery of FIG. 8 has an outermost end portion which is comprised of cathode 3 comprising aluminum foil 1 having cathode active material layer 2 formed on one (inner) side thereof and having an exposed metallic portion on the other (outer) surface thereof. Therefore, if, in this embodiment of FIG. 8, a separator made of an ion-transmitting separator material is disposed between the anode-equipotential casing and the outermost end portion (exposed cathode aluminum foil) of the spirally wound electrode assembly, some troubles would occur. That is, for example, when such a battery is over-discharged and left to stand, it is possible that ions dissolving out from the anode-equipotential casing are moved through the ion-transmitting separator, and then deposited on the surfaces of the cathode, and it is also possible that, due to the dissolving-out of tons from the casing, through-holes are formed in the casing, thus causing a leakage of an electrolyte from the battery.

Further, a non-aqueous secondary battery having such a structure (in which separator 15 in the battery of FIG. 8 is changed to one having an ion-transmitting property) has also a problem in that when it is subjected to charging, lithium ions, although in a small amount, move from the cathode active material present at the outermost end (A) of the cathode to the casing, and are deposited on the casing as a part of the anode. By contrast, the occurrence of these problems can be prevented by taking a measure such that, as indicated in FIG. 8, ion-insulating separator 15 is disposed between the casing and the outermost end portion (exposed cathode aluminum foil) of the spirally wound electrode assembly, thereby achieving an ion insulation therebetween.

Each of the embodiments described above is a cylindrical non-aqueous battery having a spirally wound electrode assembly comprising a cathode, an anode and a separator which are spirally wound together into a spirally wound structure so that the cathode and the anode are arranged opposite to each other through the separator. However, the construction of each of the above-described embodiments of the battery of the present invention can also be applied to non-aqueous batteries each having a rectangular, small-thickness shape, which are widely used in handy transportable terminal units.

An electrode assembly suitable for being accommodated in a rectangular, small-thickness casing can be obtained by, for example, a method in which a spirally wound electrode assembly having the same structure as in any one of the above embodiments is press-molded so as to have a flat form and an elliptical cross section, or a method in which the spirally winding operation is performed in a manner such that the obtained spirally wound electrode assembly has a rectangular, small-thickness shape.

Further, the electrode assembly used in the present invention is not limited to a spirally wound electrode assembly. For example, the electrode assembly used in the present invention may be either of a simply stacked laminate electrode assembly shown in FIGS. 9 and 10 and a zigzag-folded laminate electrode assembly shown in FIGS. 11 and 12, each of these electrode assemblies exhibits the same effect as the spirally wound electrode assembly.

With respect to the spirally wound electrode assembly, for enhancing safety at an accident in which the battery is exposed to heat from an external high-temperature heat source or is penetrated with an iron nail, it is preferred that the cathode metallic foil (e.g., aluminum foil) has, on the outer side thereof, an exposed metallic portion extending over a length of one wind or more from the outermost end thereof, wherein the exposed metallic portion is arranged opposite to the casing. However, with respect to a simply stacked laminate electrode assembly such as shown in FIGS. 9 and 10 and a zigzag-folded laminate electrode assembly such as shown in FIGS. 11 and 12, the safety of the battery at the above-mentioned accident can be enhanced without disposing an exposed cathode aluminum foil on the entire periphery of the electrode assembly so as to face the inner wall of the casing. That is, with respect to a battery having a stacked laminate electrode assembly or a zigzag-folded laminate electrode assembly, the safety of the battery at accidents can be satisfactorily enhanced as long as a metallic exposed portion of the cathode and a metallic exposed portion of the anode are respectively present on two opposed surfaces in the electrode assembly.

FIG. 9 is a diagrammatic cross-sectional view of one form of the non-aqueous battery of the present invention having a stacked laminate electrode assembly. In the central portion of the electrode assembly of the non-aqueous battery of the embodiment shown in FIG. 9, a cathode layer which has, on one side thereof, an exposed portion of aluminum foil 1 and an anode layer which has, on one side thereof, an exposed portion of copper foil 4 are arranged so that the exposed metallic potions of the cathode and anode are positioned opposite to each other through separators 7, 7, between which separators 7, 7 there are disposed electrically conductive, rigid or elastic member 18.

FIG. 10 is a diagrammatic cross-sectional view of another form of the non-aqueous battery of the present invention having a stacked laminate electrode assembly. In the electrode assembly of the non-aqueous battery of the embodiment of FIG. 10, each of the two outermost cathode aluminum foils 1, 1 has, on one (outer) side thereof, an exposed metallic portion, so that the exposed portion of each outermost cathode aluminum and anode casing 8 are positioned opposite to each other.

FIG. 11 is a diagrammatic cross-sectional view of one form of the non-aqueous battery of the present invention having a zigzag-folded laminate electrode assembly. In the non-aqueous battery of the embodiment shown in FIG. 11, each of the two outermost-layer portions of the zigzag-folded laminate electrode assembly has a structure in which metallic extension 11 extending from anode copper foil 4, and cathode aluminum foil 1 which has, on one side thereof, an exposed metallic portion are arranged so that metallic extension 11 and the exposed portion of cathode aluminum foil 1 are positioned opposite to each other through separator 7 (or alternatively, separator 17 having a smaller thickness than that of separator 7) and an electrically conductive, rigid or elastic member 18, wherein the electrically conductive, rigid or elastic member 18 is adapted to be able to apply a local pressure on separator 7 so that when the battery sustains a pressure from the upper and lower sides as viewed in FIG. 11, a low resistance short-circuiting easily occurs between metallic extension 11 and the exposed portion of cathode aluminum foil 1.

FIG. 12 is a diagrammatic cross-sectional view of another form of the non-aqueous battery of the present invention having a zigzag-folded laminate electrode assembly. In the non-aqueous battery of the embodiment shown in FIG. 12, each of the two outermost-layer portions of the zigzag-folded laminate electrode assembly has a structure in which cathode aluminum foil 1, which has, on both sides thereof, exposed metallic portions, is folded, and the folded cathode aluminum foil 1, and anode copper foil 4 which has, on one side thereof, an exposed metallic portion are arranged so that the folded cathode aluminum foil 1 and the exposed portion of anode copper foil 4 are positioned opposite to each other through separator 7. Further, by accommodating the above-mentioned zigzag-folded laminate electrode assembly in a casing as an anode, a low resistance short-circuiting more surely occurs.

As an electrically conductive member designated by numeral 18 in FIGS. 9 and 11, for example, use can be made of a stainless steel plate having a thickness of from 100 to 150 μm and is zigzag-folded so as to have a width of from 500 to 2000 μm, or a stainless steel plate which has a thickness of from 500 to 2000 μm and has a stripe-like concavo-convex surface structure having a depth of from 100 to 1000 μm. When electrically conductive member 18 is employed as in the non-aqueous batteries of FIGS. 9 and 11, an advantage can be achieved in that, when the batter sustains an external compressive force in two opposite directions from the upper and lower sides as viewed in FIGS. 9 and 11, the projected portions of conductive member 18 exert a local compressive pressure to separator 7 and serve to break separator 7, so that a low resistance short-circuiting more easily occurs between an exposed portion of the cathode metallic foil and an exposed portion of the anode metallic foil, thereby enhancing the safety of the battery.

By using a non-aqueous battery which has the stacked laminate electrode assembly or the zigzag-folded laminate electrode assembly and employs a separator (such as a separator made of an ion-insulating separator material, or a separator made of a material having a relatively low melting temperature, each having a thickness smaller than that of a separator disposed between a cathode active material layer and an anode active material layer) which is disposed between the casing and the stacked-laminate electrode assembly or zigzag-folded laminate electrode assembly, the same effects as those of the non-aqueous battery having a spirally wound electrode assembly can be achieved.

INDUSTRIAL APPLICABILITY

By virtue of the unique structure of the electrode assembly, the non-aqueous battery of the present invention is advantageous in that even when the battery suffers accidents, such as an accident in which the battery casing is crushed by an external pressure, an accident in which the battery is overcharged by a malfunctioning of a charging circuit or the like, an accident in which the battery is penetrated with a metallic nail or the like, and an accident in which the battery is exposed to heat from an external high-temperature heat source, a low resistance short-circuiting easily occurs between metallic segments, to thereby prevent the occurrence of a rapid temperature elevation in the battery, so that the battery can exhibit high safety.

I claim:

1. A non-aqueous secondary battery comprising: (1) a casing, (2) a non-aqueous electrolyte contained in a space defined by an inner wall of said casing, and (3) a spirally wound electrode assembly accommodated in said space, operatively with said non-aqueous electrolyte, said spirally wound electrode assembly (3) comprising:
a cathode comprising (a-1), a cathode metallic foil capable of serving as a cathode current collector, and (a-2) a cathode active material layer formed on at least one side of said cathode metallic foil (a-1), said cathode active material layer (a-1) comprising a composite metal oxide selected from the group consisting of a composite metal oxide of an alkali metal and a transition metal, and a composite metal oxide of an alkali metal, a transition metal and a non-transition metal, an anode comprising an anode active material layer, and a separator disposed between said cathode and said anode, said cathode, said anode and said separator being spirally would together into a spirally wound structure, wherein said cathode active material layer and said anode active material layer are arranged opposite to each other through said separator, said battery having a cathode-equipotential metallic segment provided in association with said cathode, wherein said cathode-equipotential metallic segment has on at least one side thereof a portion free of a cathode active material layer to provide a cathode-equipotential, exposed metallic portion ($\alpha$) longitudinally extending over a length of one wind or more of the spirally wound structure, said cathode-equipotential, exposed metallic portion ($\alpha$) being positioned opposite to an anode-equipotential, exposed metallic portion ($\beta$), which portion ($\beta$) is provided, in association with said anode, over a length of one wind or more of the spirally wound structure.

2. The battery according to claim 1, wherein said cathode-equipotential metallic segment has on both sides thereof a portion free of a cathode active material layer.

3. The battery according to claim 1 or 2, wherein said anode comprises (b-1) an anode metallic foil capable of serving as an anode current collector, and (b-2) an anode active material layer formed on at least one side of said anode metallic foil (b-1), or comprising (b-3) an anode active material metallic foil capable of serving as an anode active material layer and as an anode current collector and optionally (b-4) an anode current collector metallic foil attached, on at least one-side thereof, to said anode active material metallic foil (b-3) with electrical connection with said anode current collector metallic foil, and wherein said anode-equipotential, exposed metallic portion ($\beta$) is at least one member selected from the group consisting of:

(c) an exposed metallic portion of at least one side of said anode metallic foil (b-1), wherein said exposed metallic portion is free of said anode active material layer (b-2), (d) an exposed metallic portion of at least one side of said anode active material metallic foil (b-3), (e) an exposed metallic portion of at least one side of said anode current collector metallic foil (b-4), wherein said exposed metallic portion is free of said anode active material metallic foil (b-3) as the anode active material layer, and (f) a metallic extension having electrical connection with and extending from at least one end selected from innermost and outermost ends of said anode metallic foil (b-1), said anode active material metallic foil (b-3) or said anode current collector metallic foil (b-4).

4. The battery according to claim 3, wherein said anode comprises (b-1) an anode metallic foil capable of serving as an anode current collector, and (b-2) an anode active material layer formed on at least one side of said anode metallic foil (b-1), and said anode-equipotential, exposed metallic portion ($\beta$) is (c) a exposed metallic portion of at least one side of said anode metallic foil (b-1), wherein said exposed metallic portion is free of said anode active material layer (b-2).

5. The battery according to claim 1, wherein said cathode-equipotential, exposed metallic portion ($\alpha$) is at least one member selected from the group consisting of:

(g) an exposed metallic portion of at least one side of said cathode metallic foil (a-1) at an outermost end portion thereof, wherein said exposed metallic portion is free of said cathode active material layer (a-2), and (h) a metallic extension having electric connection with and extending from an outermost end of said cathode metallic foil (a-1).

6. The battery according to claim 1, wherein said cathode-equipotential, exposed metallic portion ($\alpha$) is at least one member selected from the group consisting of:

(g') an exposed metallic portion of at least one side said of cathode metallic foil (a-1) at an innermost end portion thereof, wherein said exposed metallic portion is free of said cathode active material layer (a-2), and (h') a metallic extension having electric connection with and extending from an innermost end of said cathode metallic foil (a-1).

7. The battery according to claim 1, wherein said cathode-equipotential, exposed metallic portion ($\alpha$) has an electrode tab for cathode-equipotentially connecting said cathode to an outside electrode disposed externally of said spirally wound electrode assembly.

8. The battery according to claim 1, wherein said anode-equipotential, exposed metallic portion ($\beta$) has an electrode tab for anode-equipotentially connecting said anode to an outside electrode disposed externally of said spirally wound electrode assembly.

9. The battery according to claim 1, wherein said separator is composed of a first separator segment ($S_1$) positioned in at least one first region in which said cathode active material layer of the cathode is opposite to said anode active material layer of the anode, and a second separator segment ($S_2$) positioned in at least one second region in which said cathode-equipotential, exposed metallic portion ($\alpha$) is positioned opposite to said anode-equipotential, exposed metallic portion ($\beta$) and wherein said first separator segment ($S_1$) is made of an ion-transmitting separator material and said second separator segment ($S_2$) is made of a separator material selected from the group consisting of an ion-insulating separator material and an ion-transmitting separator material.

10. The battery according to claim 9, wherein said second separator segment is made of an ion-insulating separator materials.

11. The battery according to claim 9 or 10, wherein said second separator segment has a melting temperature which is 100° C. or more and is at least 5° C. lower than the melting temperature of said first separator segment.

12. The battery according to claim 1, wherein said spirally wound electrode assembly has in a spiral winding center portion thereof a rigid or elastic core inserted therein, so that when said casing sustains a compressive force, said electrode assembly is adapted to be compressed between said casing and said core.

13. A non-aqueous secondary battery comprising: (1') a casing, (2') a non-aqueous electrolyte contained in a space defined by an inner wall of said casing, and (3') a stacked laminate electrode assembly accommodated in said space, operatively with said non-aqueous electrolyte, said stacked laminate electrode assembly (3') comprising:
a plurality of electrically connected cathodes, each comprising (a'-1) a cathode metallic foil capable of serving as a cathode current collector, and (a'-2) a cathode active material layer formed on at least one side of said cathode metallic foil (a'-1), said cathode active material layer (a'-1) comprising a composite metal oxide selected from the group consisting of a composite metal oxide of an alkali metal and a transition metal, and a composite metal oxide of an alkali metal, a transition metal and a non-transition metal, a plurality of electrically connected anodes, each comprising an anode active material layer, and a plurality of separators, each disposed between each cathode and each anode, each cathode, each anode and each separator being stacked into a stacked laminate structure, wherein said cathode active material layer and said anode active material layer are arranged opposite to each other through said separator, said battery having a cathode-equipotential metallic segment provided in association with said cathode, wherein said cathode-equipotential metallic segment has on at least one side thereof a portion free of a cathode active material layer to provide a cathode-equipotential, exposed metallic portion ($\alpha'$) having a length of one layer or more of the stacked laminate structure, said cathode-equipotential, exposed metallic portion ($\alpha'$) being positioned opposite to an anode-equipotential, exposed metallic portion ($\beta'$), which portion ($\beta'$) is provided, in association with said anode, over a length of one layer or more of the stacked laminate structure.

14. A non-aqueous secondary battery comprising: (1") a casing, (2") a non-aqueous electrolyte contained in a space defined by an inner wall of said casing, and (3") a zigzag-folded laminate electrode assembly accommodated in said space, operatively with said non-aqueous electrolyte, said zigzag-folded laminate electrode assembly (3") comprising:
a cathode comprising (a"-1) a cathode metallic foil capable of serving as a cathode current collector, and (a"-2) a cathode active material layer formed on at least one side of said cathode metallic foil (a"-1), said cathode active material layer (a"-1) comprising a composite metal oxide selected from the group consisting of a composite metal oxide of an alkali metal and a transition metal, and a composite metal oxide of an alkali metal, a transition metal and a non-transition metal, an anode comprising an anode active material layer, and a separator disposed between said cathode and said anode, said cathode, said anode and said separator being folded together into a zigzag-folded laminate structure, wherein said cathode active material layer and said anode active material layer are arranged opposite to each other through said separator, said battery having a cathode-equipotential metallic segment provided in association with said cathode, wherein said cathode-equipotential metallic segment has on at least one side thereof a portion free of a cathode active material layer to provide a cathode-equipotential, exposed metallic portion ($\alpha''$) having a length of one layer or more of the zigzag-folded laminate structure, said cathode-equipotential, exposed metallic portion ($\alpha''$) being positioned opposite to an anode-equipotential, exposed metallic portion ($\beta''$), which portion ($\beta''$) is provided, in association with said anode, over a length of one layer or more of the zigzag-folded laminate structure.

15. The battery according to claim 1, wherein said anode active material layer comprises a carbonaceous material.

16. The battery according to claim 1, wherein said anode active material layer comprises a composite metal oxide.

17. The battery according to claim 13, wherein said anode active material layer comprises a carbonaceous material.

18. The battery according to claim 13, wherein said anode active material layer comprises a composite metal oxide.

19. The battery according to claim 14, wherein said anode active material layer comprises a carbonaceous material.

20. The battery according to claim 14, wherein said anode active material layer comprises a composite metal oxide.

* * * * *